US007028377B2

(12) United States Patent
Yasukawa et al.

(10) Patent No.: US 7,028,377 B2
(45) Date of Patent: Apr. 18, 2006

(54) METHOD OF PRODUCING AN INK JET RECORDING HEAD

(75) Inventors: Shinji Yasukawa, Nagano (JP); Minoru Usui, Nagano (JP); Takahiro Naka, Nagano (JP); Tsuyoshi Kitahara, Nagano (JP); Noriaki Okazawa, Nagano (JP); Hideaki Sonehara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 10/425,868

(22) Filed: Apr. 30, 2003

(65) Prior Publication Data

US 2003/0193549 A1 Oct. 16, 2003

Related U.S. Application Data

(62) Division of application No. 09/576,174, filed on May 23, 2000, now Pat. No. 6,729,002, which is a division of application No. 08/708,675, filed on Sep. 5, 1996, now Pat. No. 6,139,132.

(30) Foreign Application Priority Data

| | | |
|---|---|---|
| Sep. 5, 1995 | (JP) | 7-251787 |
| Sep. 22, 1995 | (JP) | 7-269191 |
| Oct. 6, 1995 | (JP) | 7-260587 |
| Oct. 31, 1995 | (JP) | 7-306622 |
| Jun. 10, 1996 | (JP) | 8-170605 |

(51) Int. Cl.

| | |
|---|---|
| ***H04R 17/00*** | (2006.01) |
| ***B41J 2/045*** | (2006.01) |
| ***C09J 5/00*** | (2006.01) |

(52) U.S. Cl. ...................... 29/25.35; 29/890.1; 29/847; 347/70; 347/44; 347/68; 156/305; 156/293

(58) Field of Classification Search ............... 29/25.35, 29/890.1, 847; 216/27, 79, 99; 347/70, 347/44, 68, 72, 94, 71; 156/305, 293

See application file for complete search history.

(56) References Cited

U.S. PATENT DOCUMENTS

| | | | |
|---|---|---|---|
| 5,157,420 | A | 10/1992 | Naka et al. |
| 5,200,768 | A | 4/1993 | Shibaike |
| 5,375,326 | A | 12/1994 | Usui et al. |

(Continued)

FOREIGN PATENT DOCUMENTS

| | | |
|---|---|---|
| EP | 573055 | 12/1993 |

(Continued)

OTHER PUBLICATIONS

Office Action issued by JPO on Feb. 5, 2003 (only Japanese version).

*Primary Examiner*—A. Dexter Tugbang
*Assistant Examiner*—Tai Van Nguyen
(74) *Attorney, Agent, or Firm*—Sughrue Mion, PLLC

(57) ABSTRACT

A method of producing an ink jet recording head, which includes (1) fixing a passage unit in which a nozzle pate having a nozzle opening, a spacer forming a common ink chamber, and an elastic plate having a thick portion abutting against an end of a piezoelectric vibrating element are stacked, to an opening of a frame having an overhang portion which overhangs to a vicinity of the thick portion, (2) inserting a vibrating element unit into the frame, the vibrating element unit being configured by fixing piezoelectric vibrating elements operating in a longitudinal vibration mode to a fixing substrate, and (3) injecting an adhesive into a groove formed in a region opposing the fixing substrate of the frame.

2 Claims, 25 Drawing Sheets

U.S. PATENT DOCUMENTS

| | | | | | |
|---|---|---|---|---|---|
| 5,424,769 | A | * | 6/1995 | Sakai et al. | 347/70 |
| 5,471,232 | A | | 11/1995 | Hosono et al. | |
| 5,592,203 | A | | 1/1997 | Thiel | |
| 5,600,357 | A | | 2/1997 | Usui et al. | |
| 5,684,519 | A | | 11/1997 | Matoba | |
| 5,697,144 | A | | 12/1997 | Mitani | |
| 5,710,584 | A | | 1/1998 | Suzuki et al. | |
| 5,752,303 | A | | 5/1998 | Thiel | |
| 5,880,763 | A | * | 3/1999 | Tanaka et al. | 347/70 |
| 5,933,168 | A | * | 8/1999 | Sakai | 347/70 |
| 6,048,053 | A | * | 4/2000 | Kamoi et al. | 347/70 |

FOREIGN PATENT DOCUMENTS

| | | | |
|---|---|---|---|
| EP | 652108 | | 5/1995 |
| EP | 694389 | A | 1/1996 |
| EP | 738599 | | 10/1996 |
| EP | 748690 | | 12/1996 |
| JP | 55-109668 | | 8/1980 |
| JP | 59-94495 | | 5/1984 |
| JP | 60-8953 | | 3/1985 |
| JP | 62-36478 | | 2/1987 |
| JP | 63-295269 | | 12/1988 |
| JP | 3-121850 | | 5/1991 |
| JP | 3-187755 | | 8/1991 |
| JP | 3-187756 | | 8/1991 |
| JP | 3-187757 | | 8/1991 |
| JP | 4-1052 | | 1/1992 |
| JP | 4-002790 | | 1/1992 |
| JP | 4-129745 | | 4/1992 |
| JP | 5-62964 | | 3/1993 |
| JP | 5-193129 | | 8/1993 |
| JP | 5-220956 | | 8/1993 |
| JP | 6-55733 | | 3/1994 |
| JP | 6-91872 | | 4/1994 |
| JP | 6-206315 | | 7/1994 |
| JP | 7-101058 | | 4/1995 |
| JP | 7-164634 | | 6/1995 |
| JP | 7-166374 | | 6/1995 |
| JP | 7-266552 | | 10/1995 |
| JP | 7-164636 | | 6/1996 |
| JP | 6-8423 | | 1/2003 |

* cited by examiner

FIG. 4 (II)

FIG. 4 (III)

FIG. 4 (IV)

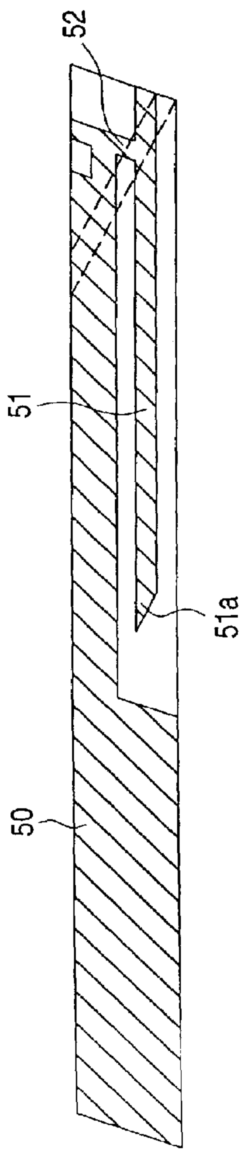
FIG. 11 (I)
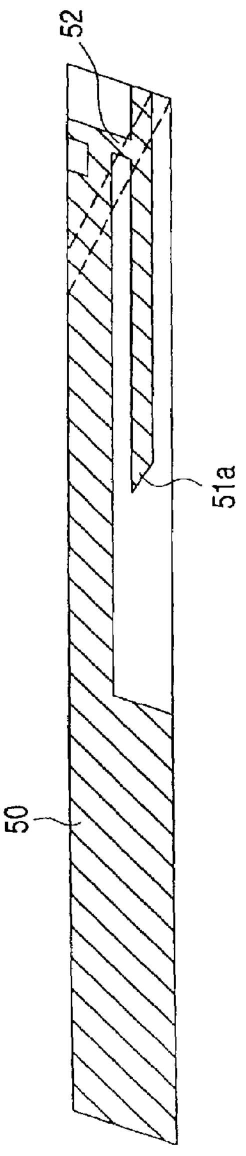
FIG. 11 (II)
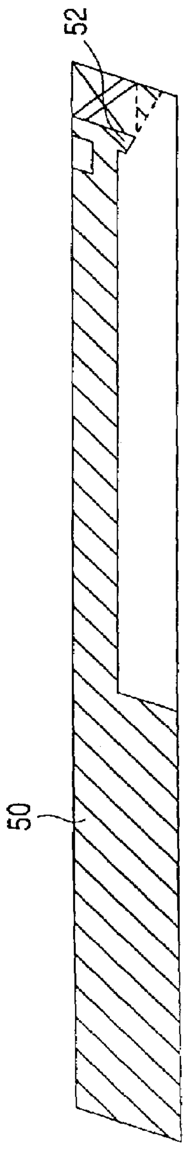
FIG. 11 (III)
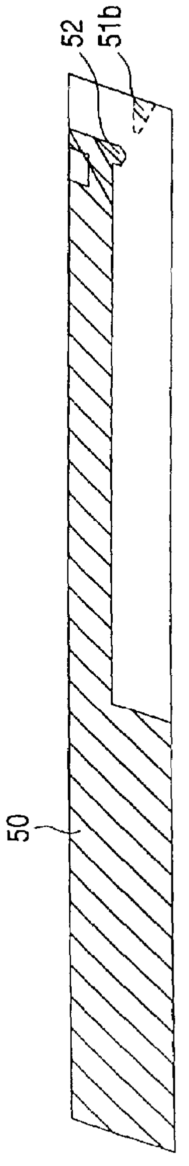
FIG. 11 (IV)

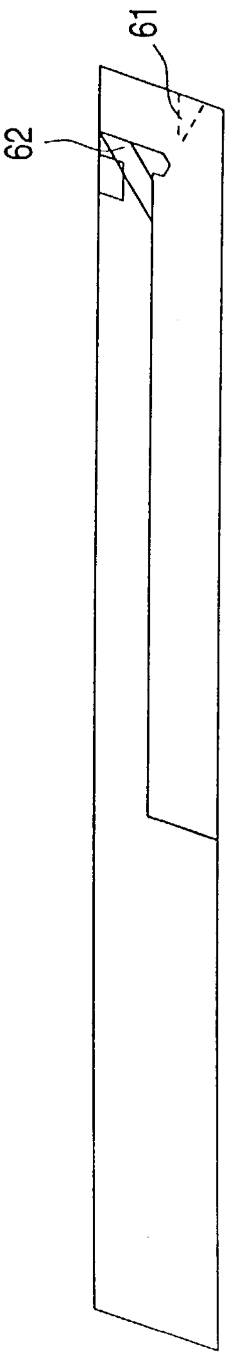
FIG. 12 (I)
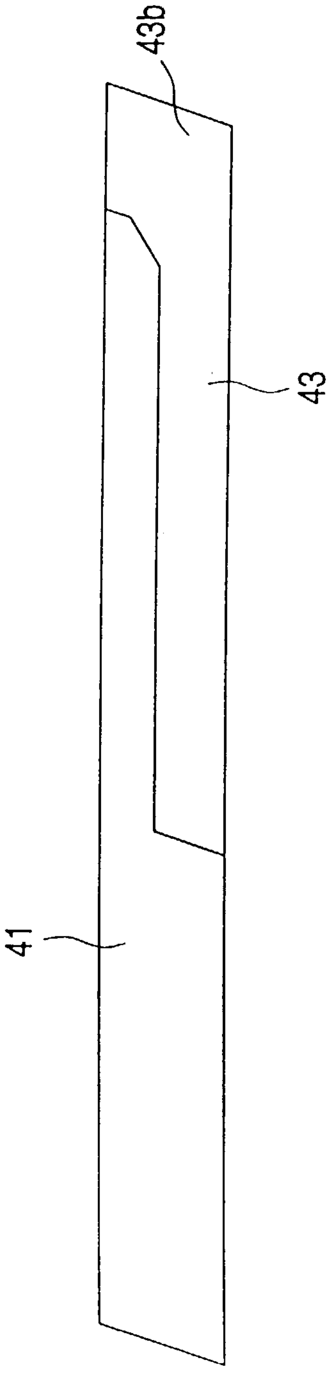
FIG. 12 (II)

FIG. 18 (II)

FIG. 18 (III)

FIG. 19 (III)

METHOD OF PRODUCING AN INK JET RECORDING HEAD

This is a division of application Ser. No. 09/576,174 filed May 23, 2000 now U.S. Pat. No. 6,729,002, which is a division of application Ser. No. 08/708,675 filed Sep. 5, 1996 now U.S. Pat. No. 6,139,132, the disclosures of which are incorporated herein by reference.

BACKGROUND OF THE INVENTION

The invention relates to an ink jet recording head in which a silicon single-crystal substrate is used for a spacer forming member, and a method of producing such an ink jet recording head.

An ink jet recording head has a pressurizing chamber formed by respectively attaching a nozzle plate in which nozzle openings are formed and an elastic plate to both faces of a spacer with an adhesive. The elastic plate is deformed by a piezoelectric vibrating element. Since the ink jet recording head of this type does not utilize a thermal energy as a driving source for ejecting ink drops, the ink quality is not thermally changed. Particularly, therefore, it is available to eject color inks which may easily be thermally deteriorated. In addition, an amount of displacement of the piezoelectric vibrating element can be adjusted so that the ink amount of each ink drop is desirably regulated. For these reasons, such a head is most suitably used for configuring a printer for color printing with a high quality.

When color printing with a higher quality is to be performed by using an ink jet recording head, higher resolution is required. As a result, sizes of a piezoelectric vibrating element, a partition wall of a spacer member, and the like are inevitably reduced so that higher precision is required in the steps of working and assembling such members.

Accordingly, it has been studied that members for an ink jet recording head are worked by adopting a parts-manufacturing technique utilizing anisotropic etching of a silicon single-crystal substrate in which minute shapes can be worked with high accuracy by a relatively easy method, i.e., a so-called micro machining technique. Various techniques and methods are proposed, for example, in Japanese Patent Application Laid-open Nos. Hei. 3-187755, Hei. 3-187756, Hei. 3-187757, Hei. 4-2790, Hei. 4-129745, and Hei. 5-62964.

When color images or characters are to be printed with a high quality, it is required not only to increase the arrangement density of nozzle openings, but also to perform the printing by a so-called area gradation in which the area of one dot is varied in accordance with an image signal. In order to perform such an area gradation, the ink amount of each ink drop in one ejecting operation must be reduced to be as small as possible, and high-speed driving must be enabled, thereby realizing a recording head by which one pixel can be printed by several ejections of ink drops.

To comply with this, first, the displacement amount of the piezoelectric vibrating element must be reduced, and the displacement must be instantaneously reflected as a volume change of a pressurizing chamber. In addition, in order to link the small volume change of the pressurizing chamber to the ejection of ink drops, it is necessary to reduce the pressure loss in the pressurizing chamber to a level as small as possible.

In order to efficiently link the displacement of the piezoelectric vibrating element to the volume change of the pressurizing chamber, it is essential to increase the rigidity of the pressurizing chamber. In order to reduce the pressure loss in the pressurizing chamber, it is essential to make the volume of the pressurizing chamber as small as possible.

In order to reduce the volume of the pressurizing chamber, it is first considered that the opening area of a spacer which forms the pressurizing chamber is reduced. In view of the working accuracy of the piezoelectric vibrating element which abuts against the spacer, the reduction is limited to about one arrangement pitch of the nozzle openings at the maximum. For this reason, the reduction of the volume must be realized by decreasing the depth of the pressurizing chamber.

In view of the handling of a spacer in the assembling step or the like, however, the spacer must have the rigidity of some extent. To comply with this, a silicon single-crystal having a thickness of at least 220 μm must be used as a silicon single-crystal substrate which constitutes the spacer. If a thin substrate having a thickness less than 220 μm, the rigidity is very low. This produces a problem in that damages or unpredictable warpage may disadvantageously occur in the assembling step.

As a method of forming a shallow pressurizing chamber in a sufficiently thick silicon single-crystal substrate by anisotropic etching, it may be contemplated to use a technique in which only one face of the silicon single-crystal substrate is etched, i.e., a so-called half etching method. Since the pressurizing chamber must be communicated with a nozzle opening for ejecting ink drops, it is necessary to form a through hole which elongates from the face where a nozzle plate is provided to the pressurizing chambers.

As well known in the art, in order to form a through hole H by anisotropic etching, as shown in FIG. 27, it is necessary to set an opening length so as to be about 1.7 (the square root of 3) or more times as large as the thickness of the silicon single-crystal substrate. If the employed substrate has a thickness of 220 μm or more, the minimum length of the opening of the through hole is about 380 μm.

As thus constructed, the volume of a communicating hole causes the volume of the pressurizing chamber to increase. In addition, the size of the communicating hole is equal to the thickness of the silicon single-crystal substrate, i.e., 220 μm, and the length in the longitudinal direction is 380 μm. Accordingly, there arises a problem in that the opening area of the silicon single-crystal substrate is increased and eventually the rigidity of the spacer is disadvantageously degraded.

In a recording head which uses a spacer made of a silicon single-crystal substrate, a piezoelectric vibrating element 130 of the longitudinal vibration mode is used as an actuator as shown in FIG. 28. The piezoelectric vibrating element 130 of the longitudinal vibration mode is fixed to a frame 135 together with a passage unit 134 which comprises an elastic plate 131, a spacer 132, and a nozzle plate 133, so as to be assembled in an ink jet recording head.

Distortion caused by a difference in coefficients of thermal expansion between ceramic constituting the piezoelectric vibrating element 130 and a material constituting the frame 135, in general, plastic occurs substantially in a proportional manner to the length L of the piezoelectric vibrating element 130. When heat is applied in an adhering step so as to obtain a high adhesive strength and then the condition is returned to a normal use condition, a temperature difference of 40° C. or more occurs. In the case where the effective length L of the piezoelectric vibrating element 130 is 5.5 mm, for example, an expansion difference of about 10 μm is caused by the above-mentioned difference, so that the elastic plate 131 may be damaged. Although such a damage may not be caused, the passage unit having a relatively low rigidity is distorted by the stress caused by the difference in thermal expansion. As a result, there arises a problem in that the flying directions of ink drops go out of alignment and errors are caused in hitting positions, thereby degrading the printing quality.

SUMMARY OF THE INVENTION

The invention provides an ink jet recording head comprising: a spacer in which pressurizing chambers, an ink supply port, and a common ink chamber are formed by anisotropic etching of a silicon single-crystal substrate; a nozzle plate having nozzle openings at the same pitches as those of the pressurizing chambers; and an elastic plate which causes the pressurizing chambers to expand and contract, the nozzle plate being attached to one face of the spacer, the elastic plates being attached to the other face of the spacer. In the ink jet recording head, the pressurizing chambers are formed as recesses by half etching of the silicon single-crystal substrate, and nozzle communicating holes through which the pressurizing chambers are connected to the nozzle openings are formed as through holes each having a size smaller than a width of each of the pressurizing chambers, by full etching of the silicon single-crystal substrate. The common ink chamber is formed as a through hole by full etching of the silicon single-crystal substrate. Since each of the pressurizing chambers is formed as a recess, the volume of the pressurizing chamber is reduced to a degree as small as possible. Each of the pressurizing chambers is connected to the corresponding nozzle opening on the other face side via the nozzle communicating hole, so that the effective volume related to the ejection of ink drops is reduced. The ratio occupied by through holes is reduced so that the inherent rigidity of the silicon single-crystal substrate is effectively used.

It is a first object of the invention to provide a novel ink jet recording head in which a silicon single-crystal substrate having a thickness as large as possible is used as a base material and which comprises a pressurizing chamber having a depth smaller than a thickness of the silicon single-crystal substrate.

It is a second object of the invention to provide an ink jet recording head in which degradation of the printing quality and damages due to a difference in thermal expansion between a piezoelectric vibrating element and a head unit or a frame are prevented from occurring.

It is another object of the invention to propose a method of producing the above-mentioned ink jet recording head.

BRIEF DESCRIPTION OF THE DRAWINGS

FIGS. 4(I) to 4(IV) are views illustrating a method of producing the spacer in the recording head.

FIGS. 11(I) to 11(IV) are views respectively illustrating other steps of forming a through hole functioning as a nozzle communicating hole by anisotropic etching.

FIGS. 12(I) and 12(II) are views respectively illustrating steps of forming a through hole and a nozzle communicating hole by anisotropic etching.

FIGS. 19(I) to 19(III) are views illustrating steps of the second half of the method of producing the recording head, respectively.

DETAILED DESCRIPTION OF PREFERRED EMBODIMENTS

Hereinafter, embodiments of the invention shown in the figures will be described in detail.

Figure 1:
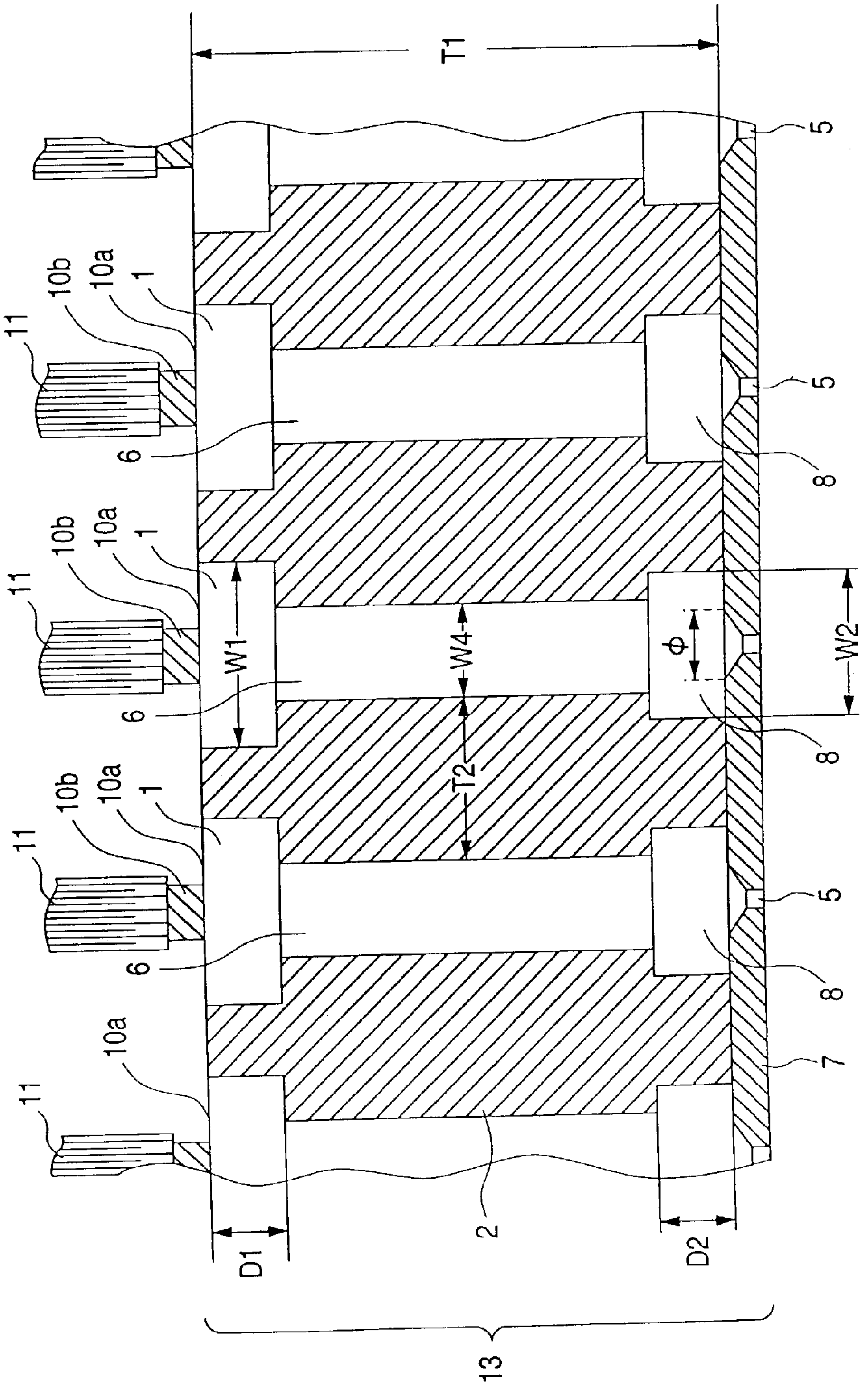
FIG. 1 is a view showing one embodiment of an ink jet recording head of the invention in a section structure taken along the direction of arranging pressurizing chambers.
Figure 2:
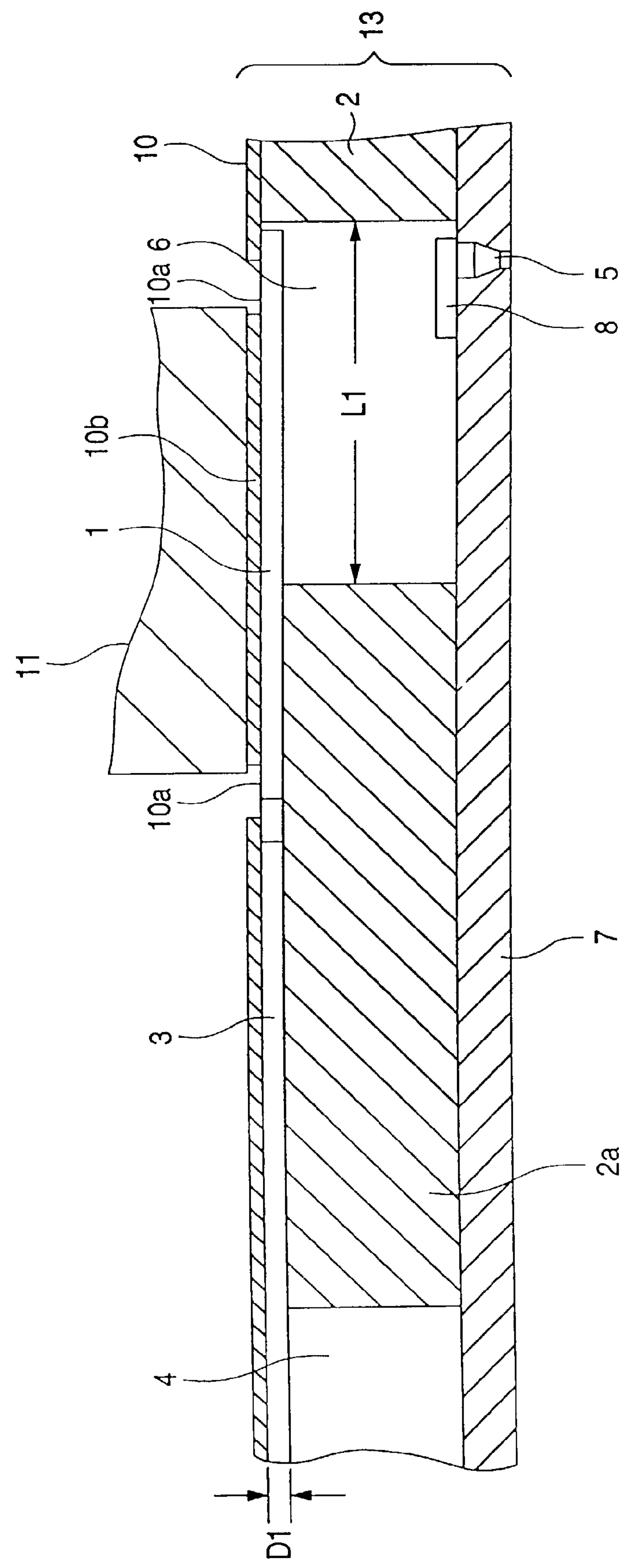
FIG. 2 is a view showing a pressurizing chamber of the ink jet recording head in a section structure taken along the longitudinal direction.
Figure 3:
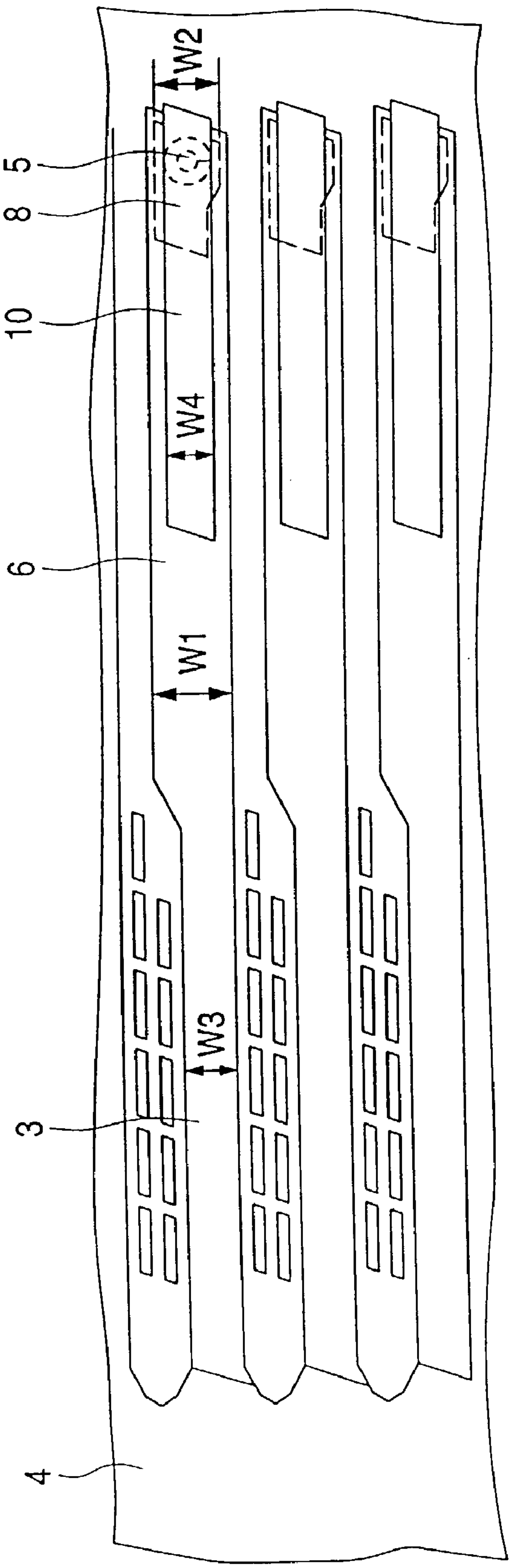
FIG. 3 is a top view slowing an embodiment of a spacer of the ink jet recording head.

FIGS. 1 and 2 show an embodiment of the invention in a section structure in the vicinity of pressurizing chambers 1. FIG. 3 shows a top structure of a spacer 2 according to the present invention. The spacer 2 is formed by subjecting anisotropic etching on a silicon single-crystal substrate used as a base material, having the surface of a predetermined crystal orientation, for example, a crystal orientation (110). On one face, formed are the pressurizing chamber 1 having a depth D1 which is smaller than the thickness T1 of the silicon single-crystal substrate constituting the spacer 2, and an ink supply port 3.

A common ink chamber 4 is formed as a through hole so as to be communicated with the ink supply port 3. On one end of the pressurizing chamber 1, a nozzle communicating hole 6 is formed for connecting the pressurizing chamber 1 to a nozzle opening 5. In order to increase flexibility in connection to the nozzle opening 5, a recess 8 is formed in the nozzle communicating hole 6 on the side of a nozzle plate 7. The recess 8 is larger than the diameter ϕ of the inflow side of the nozzle opening 5. The recess 8 has a width W2 which is smaller than the width W1 of the pressurizing chamber 1, and has a depth D2 which is substantially equal to the depth D1 of the pressurizing chamber 1 and the ink supply port 3.

The ink supply port 3 is formed as a recess having a depth which is equal to the depth D1 of the pressurizing chamber 1, but narrower than the pressurizing chamber. Namely, the width W3 of the ink supply port 3 is substantially one half of the width W1 of the pressurizing chamber 1. According to this configuration, ink which has been pressurized in the pressurizing chamber 1 is suppressed so as not to return to the side of the common ink chamber 4 as much as possible, thereby allowing a much more amount of ink to be ejected through the nozzle opening 5.

The pressurizing chamber 1, the ink supply port 3, and the recess 8 are formed by so-called half etching in which anisotropic etching is performed from one face of a silicon single-crystal substrate functioning as a base material of the spacer 2, and the etching is stopped when the etched depths of D1 and D2 are attained.

The common ink chamber 4 is required to have a large opening area for covering all of the pressurizing chambers 1 arranged in one row. Thus, the common ink chamber 4 is formed as a through hole by performing anisotropic etching on both faces of the silicon single-crystal substrate.

On the other hand, the nozzle communicating hole 6 for connecting the pressurizing chamber 1 to the nozzle opening 5 of the nozzle plate 7 is formed so as to elongate in a longitudinal direction of the pressurizing chamber 1 by full etching so that a length LI required for passing through (L1 is the square root of 3 times or more as much as the thickness T1 of the silicon single-crystal substrate) is attained in the longitudinal direction of the pressurizing chamber 1, while suppressing the width W4 to be as small as possible.

Preferably, the thickness T2 of a partition wall of the nozzle communicating hole 6 is larger than the width W4 of the nozzle communicating hole 6. If the width W4 of the through hole constituting the nozzle communicating hole 6 is selected to be 70 μm or less, the thickness T2 of the partition wall of the nozzle communicating hole 6 is selected to be 70 μm or more, and the depth D1 of the pressurizing chamber 1 is selected to be 60 μm or less, for example, the compliance of the pressurizing chamber 1 can be made as small as possible. If the diameter of the nozzle opening 5 is about 25 μm, ink drops of about 10 nanogram (about $10\times10^{-6}$ $mm^3$) can be ejected and they can be caused to fly at a velocity of 7 meters per second or higher in the air.

In the thus configured spacer 2, an elastic plate 10 having a deformable thin portion 10*a* and a thick portion 10*b* for efficiently transmitting the vibration of the piezoelectric vibrating element 11 to the whole of the pressurizing chamber is fixed to the face on the side of the pressurizing chamber, and the nozzle plate 7 is fixed to the other face. These elements are assembled into a passage unit 13. An end of the piezoelectric vibrating element 11 abuts against the thick portion 10*b* via a head frame which will be described later, so as to constitute a recording head.

In the embodiment, when a driving signal for expanding the piezoelectric vibrating element 11 is applied, the elastic plate 10 is expanded and displaced to tile side of the pressurizing chamber 1 so as to cause the pressurizing chamber 1 to contract. Accordingly, ink in the pressurizing chamber 1 is pressurized and ejected as an ink drop from the nozzle opening 5 via the nozzle communicating hole 6.

The pressurizing chamber 1 is configured so as to have the depth D1 which is smaller than the thickness T1 of the silicon single-crystal substrate constituting the spacer 2, and the nozzle communicating hole 6 is formed so as to have the width W4 which is to be as small as possible. As a result, the rigidity of the region forming the pressurizing chamber is increased. Accordingly, the expansion and contraction of the piezoelectric vibrating element 11 which is displaced by a very minute distance and which is impulsively deformed are absorbed at a reduced ratio by a wall 2*a* for partitioning the pressurizing chambers 1. Therefore, the expansion and contraction of the piezoelectric vibrating element 11 efficiently act on the change of the volume of the pressurizing chamber 1, and an ink drop of a small ink amount can be surely ejected at a predetermined velocity. As the rigidity of the spacer 2 is increased, the deformation of the passage unit 13 caused by the displacement of the piezoelectric vibrating element 11 is reduced. Consequently, the precision of arrival positions of ink drops can be maintained. Since the effective volume of the pressurizing chamber 1 is small, the flow of the ink accommodated therein can sufficiently follow the piezoelectric vibrating element 11 of a longitudinal vibration mode which can be driven at a high speed, with the result that the repetition frequency of ink drop ejection is increased.

According to the above-described recording head of the invention, the above-mentioned features cooperate so that, in response to a printing signal for one pixel, minute ink drops can impact against printing paper at one point, at a constant velocity, and with high positioning accuracy, thereby enabling pixels to be represented by area gradation.

Next, a method of producing the above-described passage unit 13 will be described with reference to FIGS. 4(I) to 4(IV).

In FIG. 4(I), the reference numeral 20 designates a silicon single-crystal substrate having the surface of a crystal orientation (110) and having a thickness at which the substrate can be easily handled in an assembling step, for example, a thickness of 220 μm. On both faces thereof, etching protecting films 23 and 24 of silicon dioxide ($SiO_2$) are formed. The etching protecting films 23 and 24 have windows 21 and 22 in through hole regions, i.e., in regions where the nozzle communicating hole 6 is to be formed, in the figure.

In regions corresponding to a pressurizing chamber 1 and a recess 8 for the connection to a nozzle opening 5, thick etching protecting films 25 and 26 of silicon dioxide ($SiO_2$) which can bear the formation of a through hole are formed.

Under this condition, the silicon single-crystal substrate 20 is immersed in an anisotropic etching fluid of an aqueous solution of potassium hydroxide (KOH) of a concentration of about 25 wt % which is kept at 80° C. Then, the anisotropic etching is started from both faces or the windows 21 and 22, so as to form a through hole 25 which will serve as the common ink chamber 4 and the nozzle communicating holes 6 (FIG. 4(II)).

Figure 4:
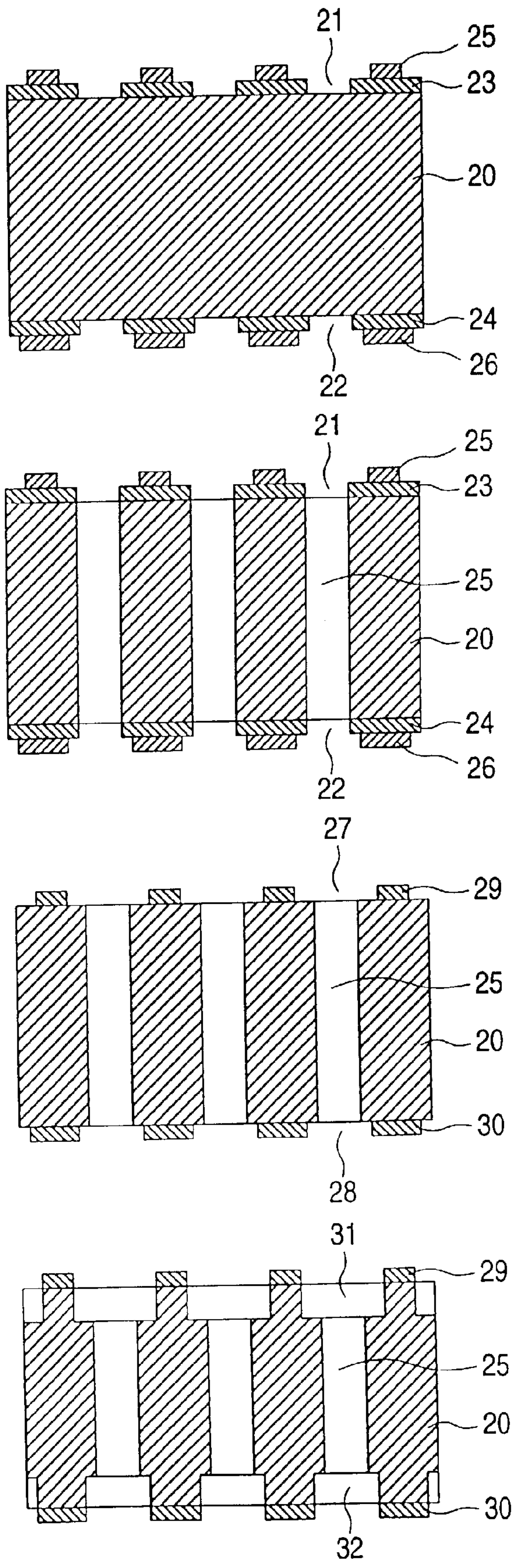

Thereafter, the protecting films 23 and 24 of silicon dioxide are etched away so that etching protecting films 29 and 30 having windows 27 and 28 remain in regions which will serve as the pressurizing chamber 1 and the recesses 8 for the connection to the nozzle opening 5 (FIG. 4(III)). Anisotropic etching is performed in the same way as described above by immersing the silicon single-crystal substrate 20 in an anisotropic etching fluid.

The etching is stopped when the anisotropic etching reaches predetermined depths D1 and D2, so that a shallow recess 31 which will serve as the pressurizing chamber 1 and the ink supply port 3 is formed on one face, and a recess 32 serving as the recess 8 which will further serve as a communicating portion with the nozzle opening 5 is formed on the other face (FIG. 4(IV)).

As a result, the pressurizing chamber 1, the ink supply port 3, and the recess 8 for the connection to a nozzle opening are formed as shallow recesses. In addition, the through hole 25 is formed. The through hole 25 passes through the silicon single-crystal substrate 20 from the recess 31 which is formed on one face and will serve as the pressurizing chamber 1, to the recess 32 for the connection to the nozzle opening which is formed on the other face. The through hole 25 has the width W4 which is smaller than the width W1 of the pressurizing chamber 1.

At last, the etching protecting films 29 and 30 of silicon dioxide $SiO_2$) which are no more necessary are removed away. As required, a silicon dioxide film is formed again on an entire surface. Thereafter, the elastic plate 10 is fixed to one face, and the nozzle plate 7 is fixed to the other face with an adhesive, thereby completing the passage unit 13.

In the embodiment, the silicon dioxide ($SiO_2$) films are formed so as to have two levels of thickness. Accordingly, it is required to perform only one time the mask alignment process, with the result that relative positions of the recesses 31 and 32 with respect to the through hole 25 can be set with high accuracy.

In the embodiment, in order to increase flexibility in the connection of the nozzle opening 5 to the communicating hole 6, the recess 8 for the connection is formed. However, the formation has no direct relationship to the function of the ink ejection, and hence the formation may be performed as required.

Figure 5A:
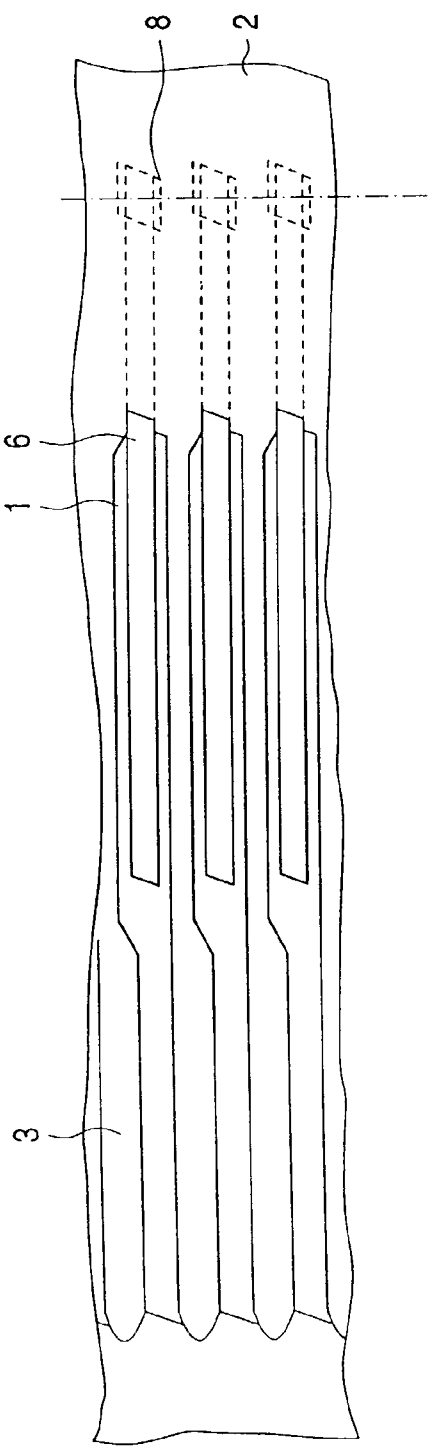
FIGS. 5*a* and 5*b* are views of another embodiment of the invention in a top structure of a spacer and a section structure thereof, respectively.
Figure 5B:
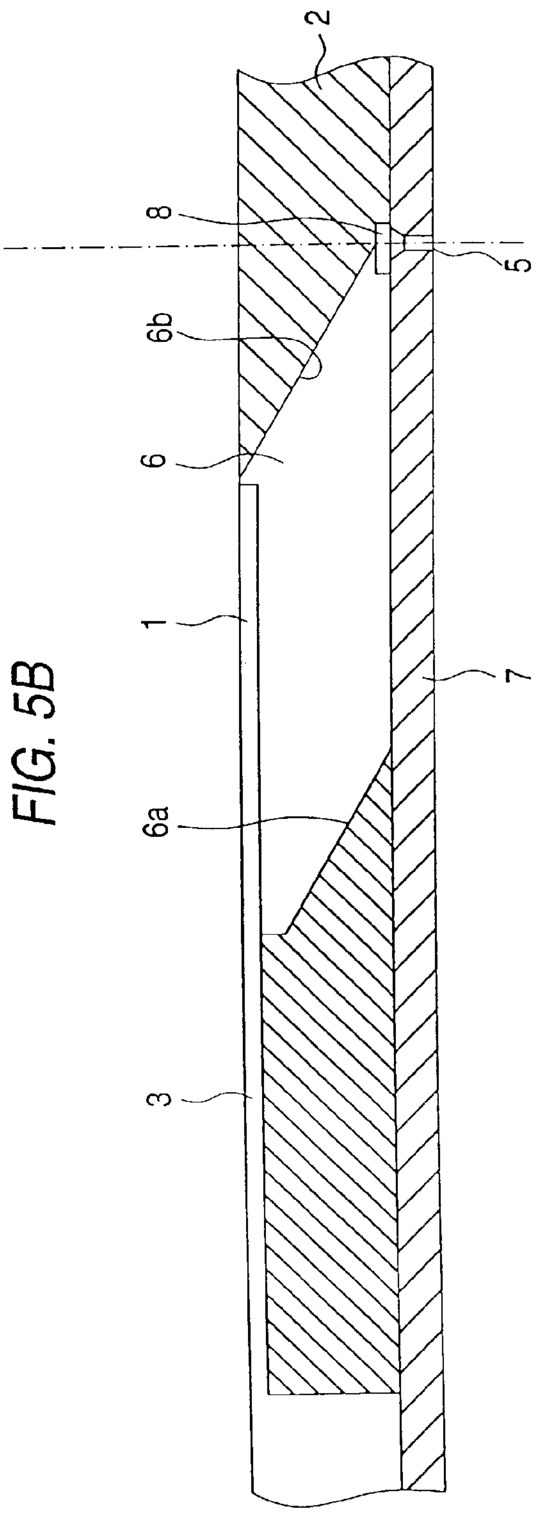

In the above-described embodiment, the nozzle communicating hole 6 is formed in a region which overlaps the pressurizing chamber 1. Alternatively, as shown in FIGS. 5*a* and 5*b*, an end 6*a* may be positioned outside the pressurizing chamber 1. In the alternative, if the pressurizing chamber 1 is shortened in the longitudinal direction, the through hole can be formed without increasing the volume of the pressurizing chamber 1. In addition, if slopes 6*a* and 6*b* are formed so as to guide the ink to the nozzle opening side, removal of air bubbles can be promoted.

Figure 6:
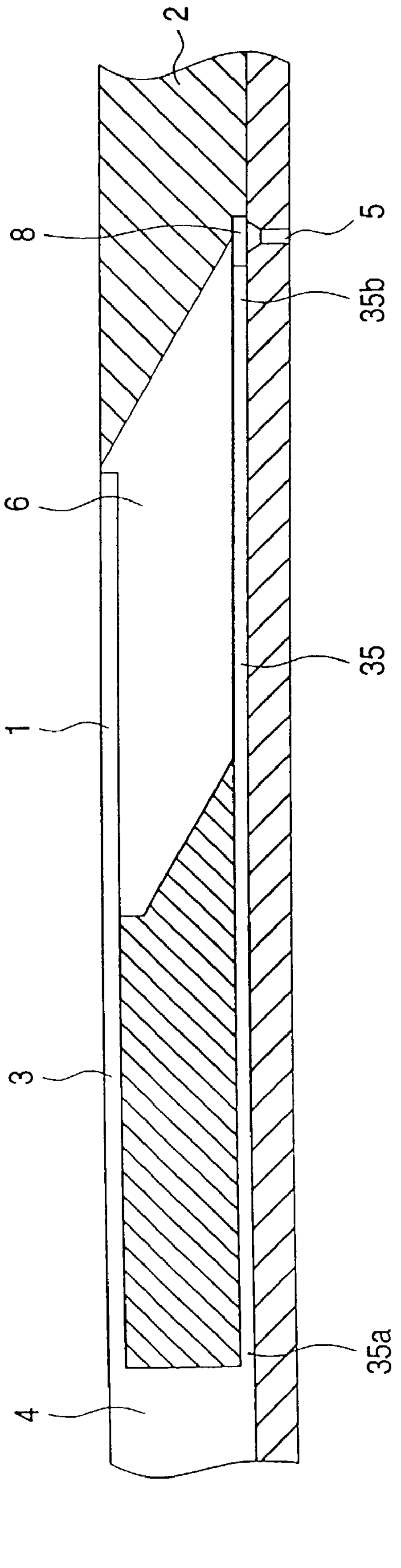
FIG. 6 is a view of another embodiment of the invention in a section structure of a spacer.

In the above-described embodiment, the recess 8 for the connection to the nozzle opening 5 is formed in a limited area in the vicinity of the nozzle opening 5. Alternatively, as shown in FIG. 6, a recess 35 having a width substantially equal to the width W2 of the pressurizing chamber 1 or the width W4 of the recess 8 may be formed. One end 35*a* of the recess 35 is communicated with the common ink chamber 4 in a similar manner as the pressurizing chamber 1 and the ink supply port 3. The other end 35*b* of the recess extends to a region opposing the nozzle opening 5. In the alternative, the flexibility of connection to the nozzle opening 5 is increased. In addition, the recess 35 may be utilized as a second ink supply port so that the ink supply to the pressurizing chamber 1 after the ink drop ejection is performed from both faces, i.e., the surface and the back face.

Figure 7A:
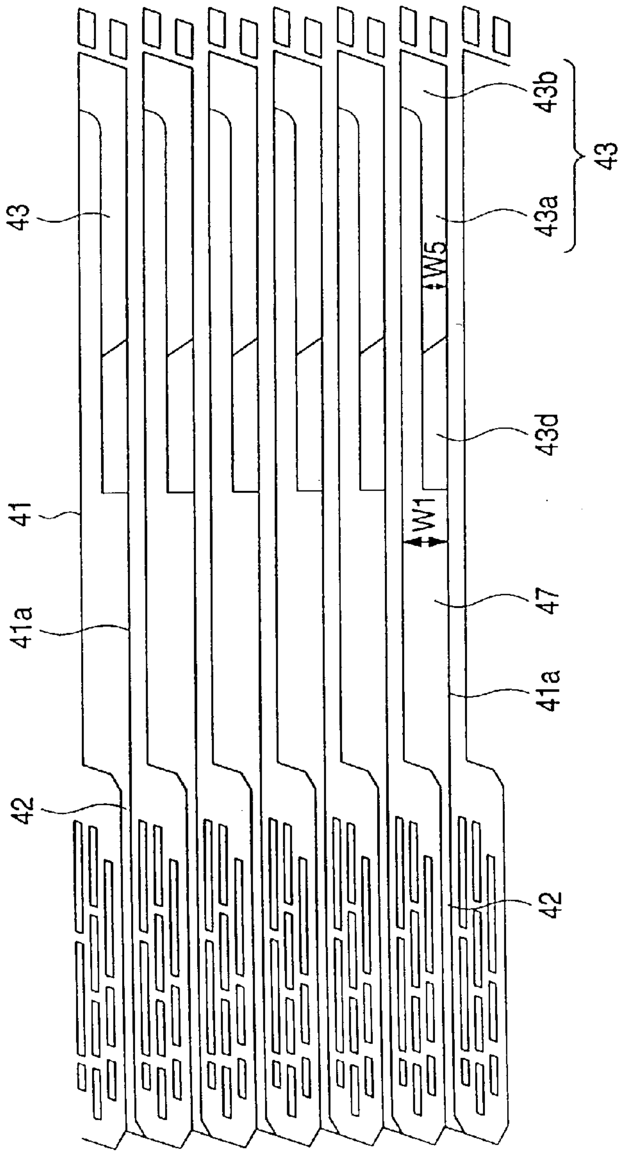
FIGS. 7*a* and 7*b* are views of another embodiment of the invention in a top structure of a spacer and a section structure thereof, respectively.
Figure 7B:
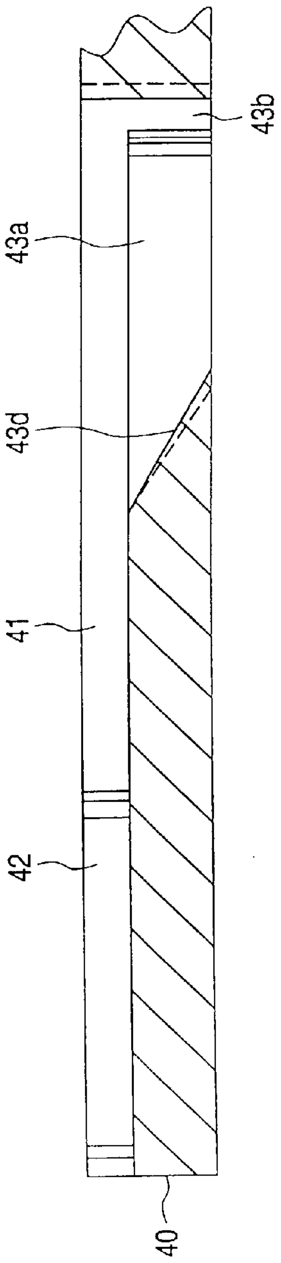
Figure 8:
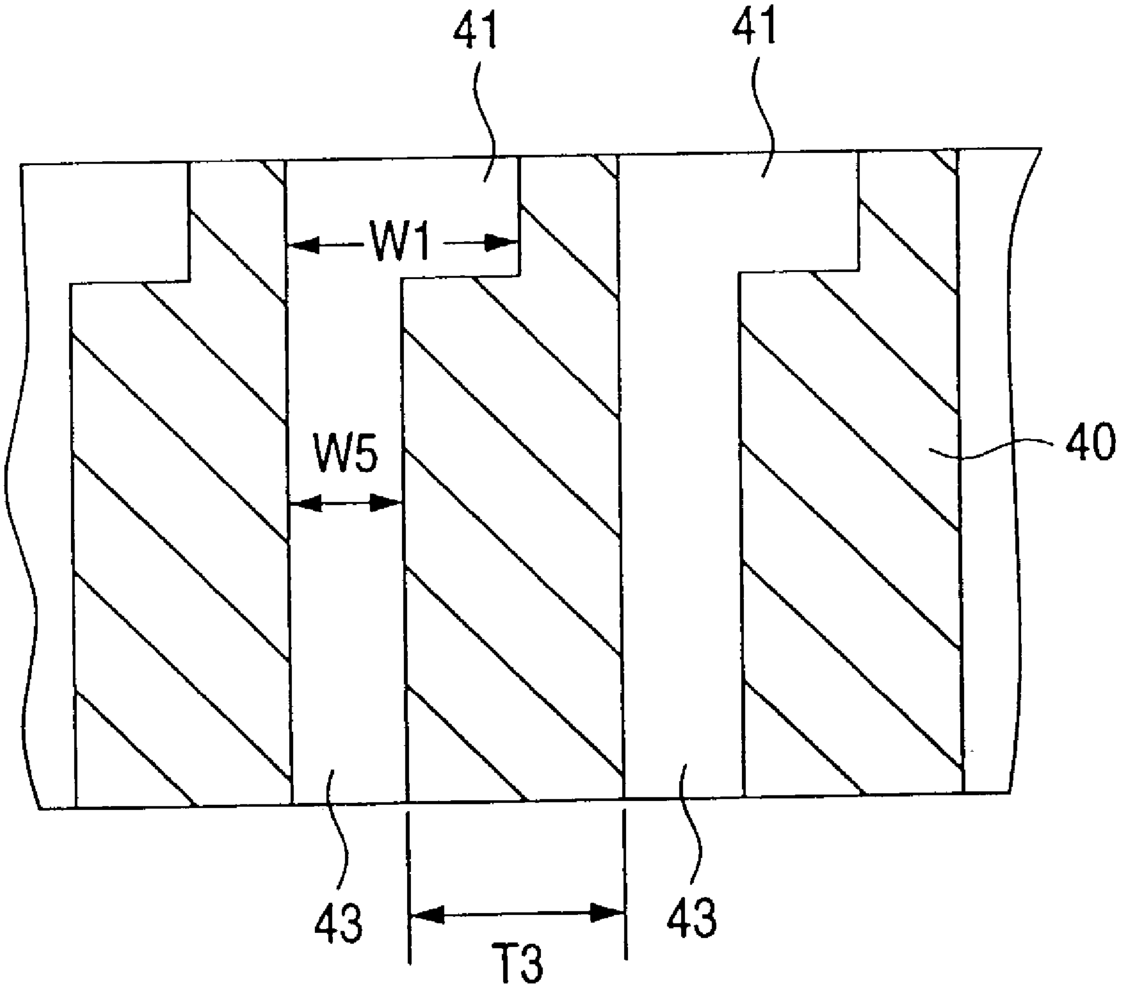
FIG. 8 is a view showing a section structure of the above-mentioned spacer taken along the direction of arranging pressurizing chambers.

FIGS. 7*a*, 7*b*, and 8 show another embodiment of a spacer used in the ink jet recording head of the invention. In a spacer 40, a pressurizing chamber 41 and an ink supply port 42 are formed as recesses on one face by conducting anisotropic etching of a silicon single-crystal substrate having the surface of a crystal orientation (110) in the same way as described above. A nozzle communicating hole 43 nozzle communicating hole 43 is a through hole which has a substantially L-like shape and which comprises portions 43*a* and 43*b*. The portion 43*a* having a width W5 which is about one half of the width W1 of the pressurizing chamber 41 is formed along one partition wall 41*a* of the pressurizing chamber 41 and extends from one end of the pressurizing chamber 41 on the side of the nozzle opening to a region where a nozzle opening 5 is positioned. The portion 43*b* in a region opposing the nozzle opening 5 has a width almost equal to the width of the pressurizing chamber 41.

As described above, the nozzle communicating hole 43 corresponds to one partition wall of the pressurizing chamber 41, and the width of the nozzle communicating hole 43 is increased at an end of the pressurizing chamber 41 on the nozzle opening side. This enables the width of the pressurizing chamber 41 to be made as small as possible, and the through hole to be formed so as to have a short length. In addition, a slope 43*d* in which the nozzle opening side is placed down is formed so that the ink smoothly flows. As a result, it is possible to prevent stagnation of air bubbles caused by stagnation of ink from occurring.

Also in the embodiment, in the same manner as the above-described embodiment, as shown in FIG. 8, the thickness T3 of the wall between the nozzle communicating holes 43 is formed so as to be larger than the width W5 of the nozzle communicating hole 43. Preferably, the width W5 of the through hole constituting the nozzle communicating hole 43 is selected so as to be 70 μm or less, the thickness T3 of the wall between the nozzle communicating holes 43 is selected so as to be 70 μm or more, and the depth of the pressurizing chamber 41 formed by half etching is selected so as to be 60 μm or less. In this case, the compliance of the pressurizing chamber 41 can be made as small as possible. As a result, ink drops of about 10 nanogram ($10\times10^{-6}$ $mm^3$) can be ejected and caused to fly at a velocity of 7 meters or more per second from the nozzle opening having a diameter of 25 μm.

Figure 9A:
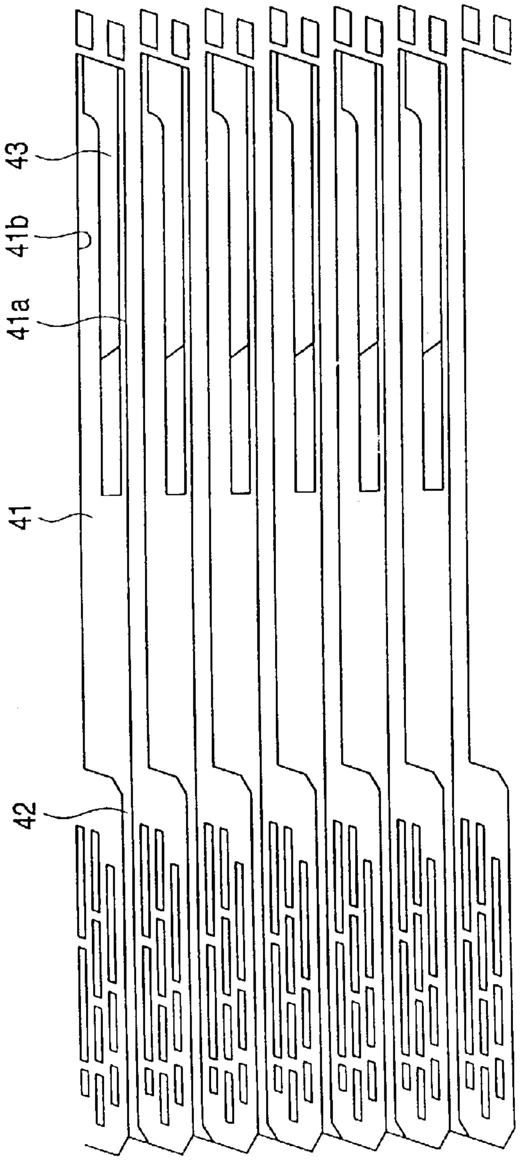
FIGS. 9*a* and 9*b* are views of another embodiment of the invention in a top structure of a spacer and a section structure thereof, respectively.
Figure 9B:
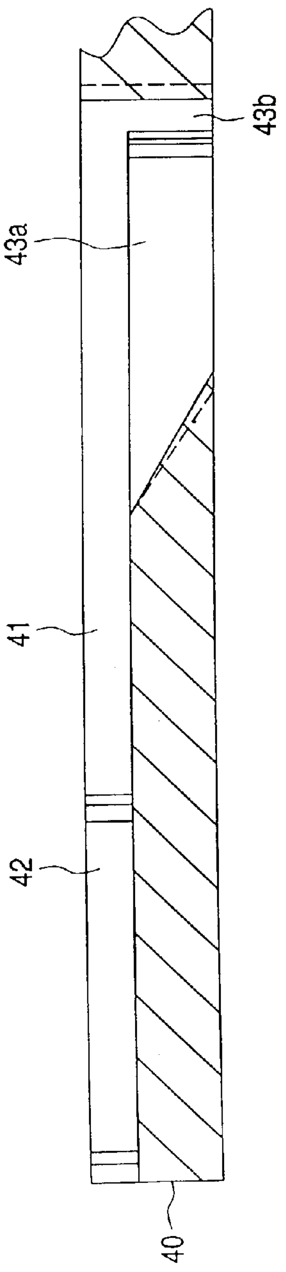
Figure 10A:
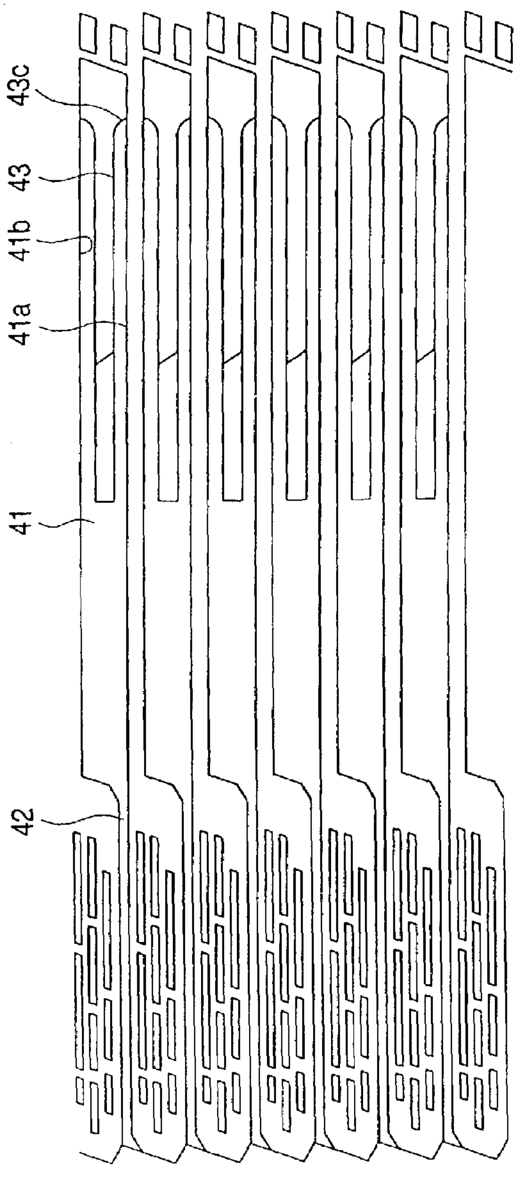
FIGS. 10*a* and 10*b* are views of another embodiment of the invention in a top structure of a spacer and a section structure thereof, respectively.
Figure 10B:
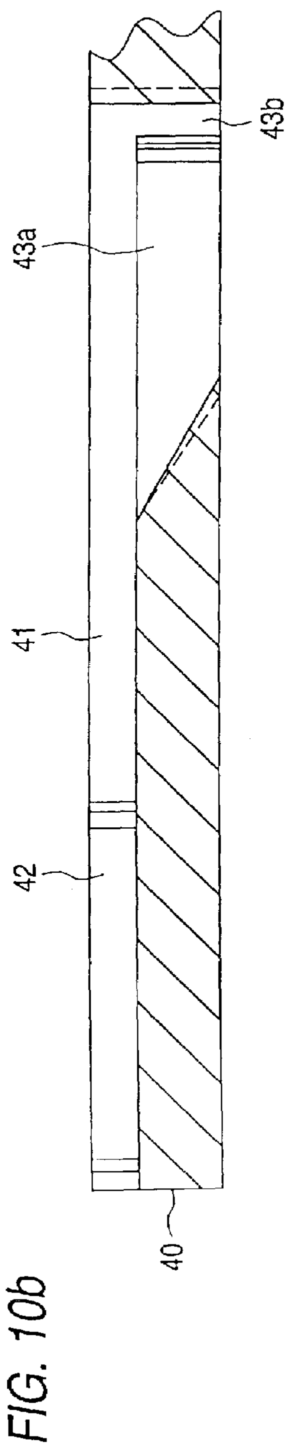

In the embodiment, one of the walls of the nozzle communicating hole 43 corresponds to the partition wall 41*a* of the pressurizing chamber 41. Alternatively, as shown in FIGS. 9(*a*) and 9(*b*), both walls of through holes 43*a* are of f-set parallel from partition walls 41*a* and 41*b* of the pressurizing chamber 41 to have a predetermined distance therebetween. Desirably, as shown in FIGS. 10(*a*) and 10(*b*), a wall 43*c* of the nozzle opening side is tapered so that the avoidance of air bubbles is enhanced.

FIGS. 11 and 12 show other embodiments of a method of forming the nozzle communicating hole 43, respectively. In the figures, a hole in the vicinity of the pressurizing chamber is shown by way of an example. In FIGS. 11(I) to 11(IV), a hatched region indicates an etching protecting film.

As for the etching protecting film specified and shown by hatching, in the pressurizing chamber, an etching protecting film 50 is formed in a region where a recess is to be formed by half etching. A narrow protecting film 51 which has a tapered end 51*a* is formed in a substantially center portion of the nozzle communicating hole 43 which is to be formed as a through hole. A protecting film 52 which narrowly elongates so as to divide the through hole is formed in a region formed so as to surround the nozzle opening. These protecting films are provided after positioned on both faces of the silicon single-crystal substrate (FIG. 11(I)).

The silicon single-crystal substrate on which such etching protecting films are formed is immersed in an anisotropic etching fluid, and anisotropic etching is started from both faces. Regions on which the protecting films are not formed are etched away, and an end 51*a* of the region protected by the protecting film 51 is also etched away (FIG. 11(II)). When the etching on both faces proceeds in this way to pass through the substrate, the region protected by the protecting film 51 is also etched away, and the end 51*a* thereof reaches the position of the protecting film 52 (FIG. 11(III)). The etching is further performed so that the rear end side 51*b* of the protecting film 51 is separated from the portion protected by the protecting film 52 (FIG. 11(IV)).

The etching protecting films 50, 52, and 51*b* which are left on the face to be a pressurizing chamber are removed away (FIG. 12(I)). Thereafter, anisotropic etching is performed again. The etching is stopped when the etching reaches a depth which is optimum as the pressurizing chamber. As a result, recesses which will serve as the pressurizing chamber and an ink supply port are formed, and portions 61 and 62 which are left on the end side of the pressurizing chamber are removed away (FIG. 12(II)).

Also in the above-described embodiment, a recess (a recess indicated by the reference numeral 35 in FIG. 6) is formed on the back face opposing the pressurizing chamber so as to elongate from a common ink chamber 4 to a nozzle opening 5, thereby allowing ink from the common ink chamber 4 to be supplied to the pressurizing chamber 1 through both of the surface and back faces.

In the embodiment, the common ink chamber 4 is formed as a through hole. Alternatively, in order to further reduce the ink amount of an ink drop and to increase the rigidity so as to realize high-speed driving, it is desired that the common ink chamber 4 is formed not as a through hole but as a recess so that a bottom portion having a constant thickness is left in the spacer 2, in the same manner as the pressurizing chamber.

Figure 13A:
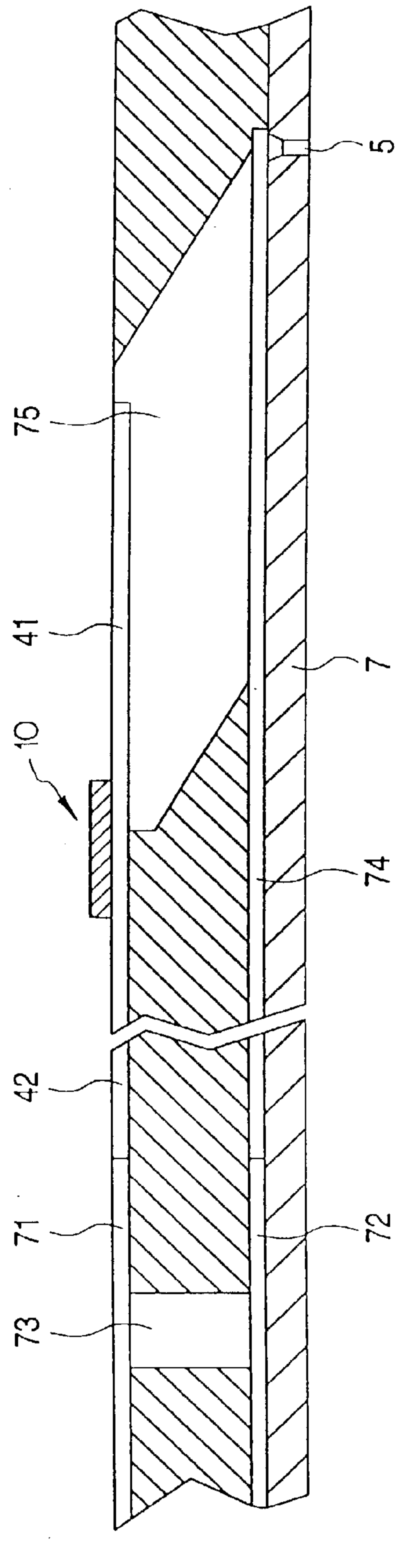
FIGS. 13*a* and 13*b* are views showing another embodiment of the invention in which a common ink chamber is formed as a recess, in a section structure taken along a longitudinal direction of a pressurizing chamber of a spacer, respectively.
Figure 13B:
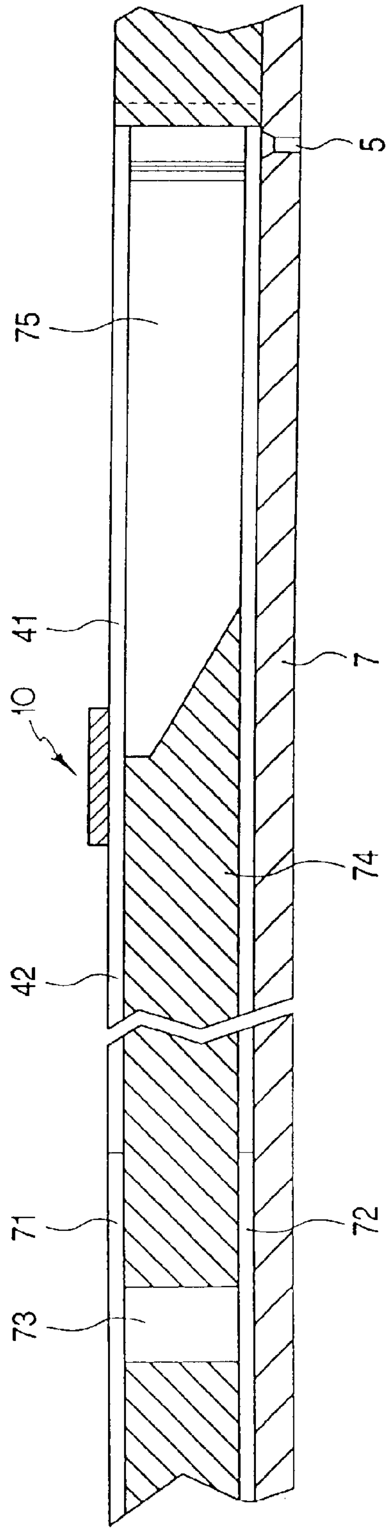

Specifically, as shown in FIGS. 13*a* and 13*b*, a first common ink chamber 71 is formed on a face opposing the elastic plate. The first common ink chamber 71 is formed as a recess which is communicated with all ink supply ports 42 connected to the respective pressurizing chambers 41. On the face opposing the nozzle plate 7, formed is a second common ink chamber 72. The second common ink chamber 72 is formed as a recess which cooperates with the first common ink chamber 71 so as to ensure a volume for accommodating ink required for printing.

In order to communicate the first common ink chamber 71 with the second common ink chamber 72, a connection hole 73 configured by a through hole is formed at an appropriate position in a region in which the first common ink chamber 71 faces the second common ink chamber 72. The provision of the connection hole 73 increases the flowability of the ink in the first and second common ink chambers 71 and 72.

According to the embodiment, when ink is supplied from the ink tank to either of the first common ink chamber 71 on the side of the elastic plate 10 and the second common ink chamber 72 on the side of the nozzle plate 7, the ink flows into the other one of the common ink chambers 72 and 71 via the connection hole 73. Thus, in accordance with the total volume of the two common ink chambers 71 and 72, an amount of ink required for the printing can be supplied to the pressurizing chamber 41 through the ink supply port 42 only, or in a condition in which the recess 74 and the nozzle communicating hole 75 are used. The area occupied by through holes formed in the whole of the spacer 40 is reduced, so that the rigidity of the spacer 40 is increased. Therefore, the assembling process is easily perfonried, and additionally, the warpage of the whole recording head caused by the displacement of the piezoelectric vibrating element 11 during printing is reduced in degree so that the accuracy of the hitting positions of ink drops on the recording medium is enhanced.

Figure 14A:
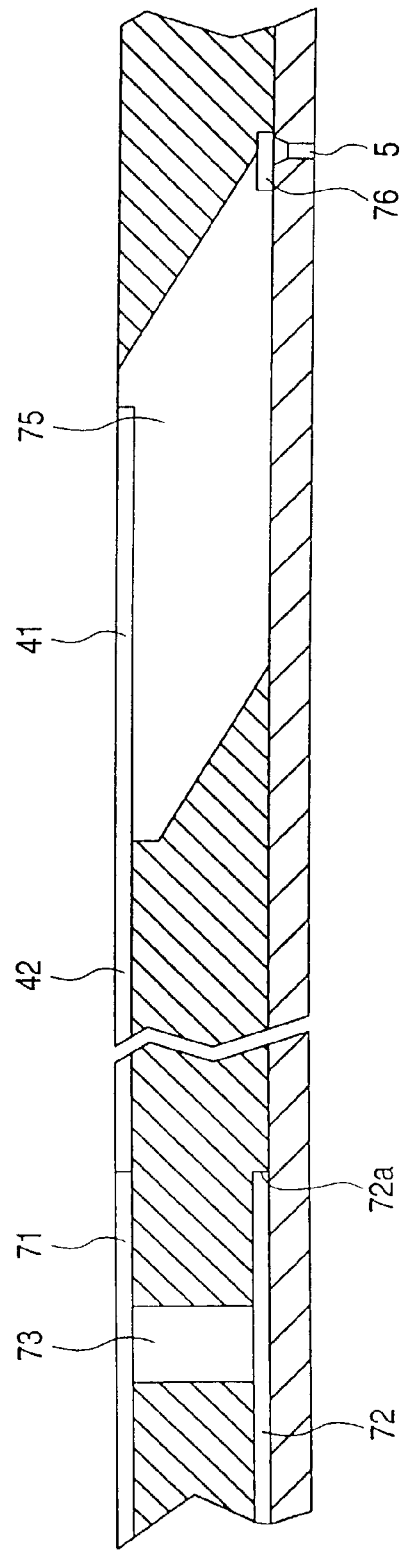
FIGS. 14*a* and 14*b* are views showing another embodiment of the invention in which a common ink chamber is formed as a recess, in a section structure taken along a longitudinal direction of a pressurizing chamber of a spacer, respectively.
Figure 14B:
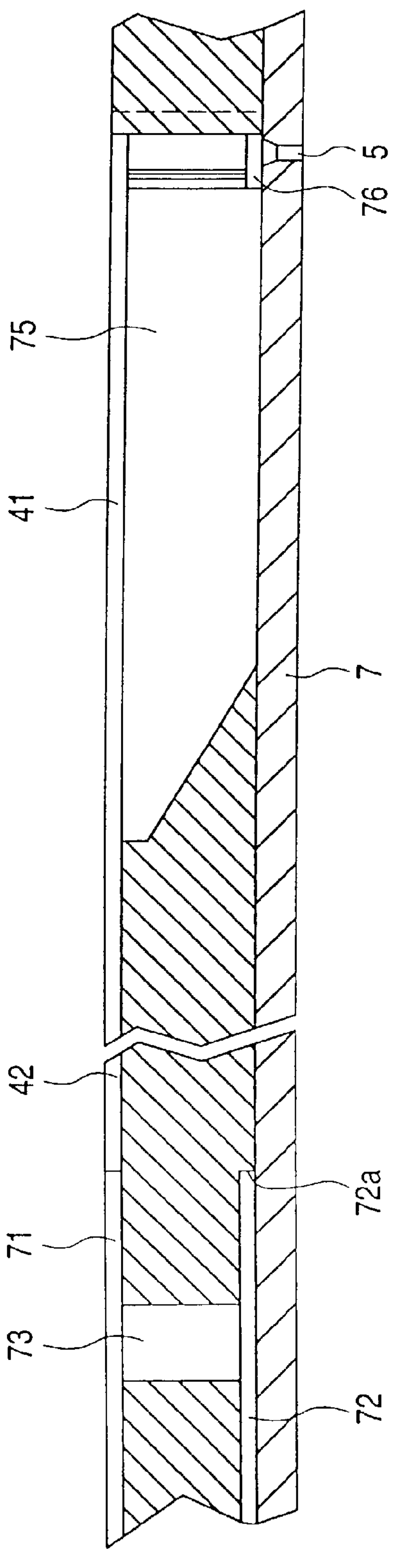

In the embodiment, the recess 72 which forms the second common ink chamber 72 elongates to the vicinity of the nozzle opening. Alternatively, as shown in FIGS. 14*a* and 14*b*, an end 72*a* of the recess may be stopped at a position in which a volume for a common ink chamber is ensured, and a nozzle connection hole 76 may be formed.

In the spacer 40 shown in FIGS. 13*a* and 13*b*, a through hole which will serve as a nozzle communicating hole 75, and a through hole which will serve as the connection hole 73 for connecting the fist common ink chamber 71 to the second common ink chamber 72 are first formed by anisotropic etching on both faces of a silicon single-crystal substrate. Next, recesses which will serve as the pressurizing chamber 41, the ink supply port 42, and the first common ink chamber 71 are formed by half etching on one face of the silicon single-crystal substrate. A recess which will serve as the second common ink chamber 72, and a recess 76 for facilitating the connection of the nozzle communicating hole 75 to the nozzle opening 5 may be simultaneously formed by half etching on one process for the surface and the back face, or separately in different steps.

In the embodiment, the second common ink chamber 72 is provided on the side of the nozzle plate 7. In the case where a sufficient volume can be ensured as a common ink chamber in a recess on one face, it is apparent that the common ink chamber 71 may be provided only on the face on which the pressurizing chamber 41 is formed, as shown in FIGS. 15*a* and 15*b*.

Figure 15A:
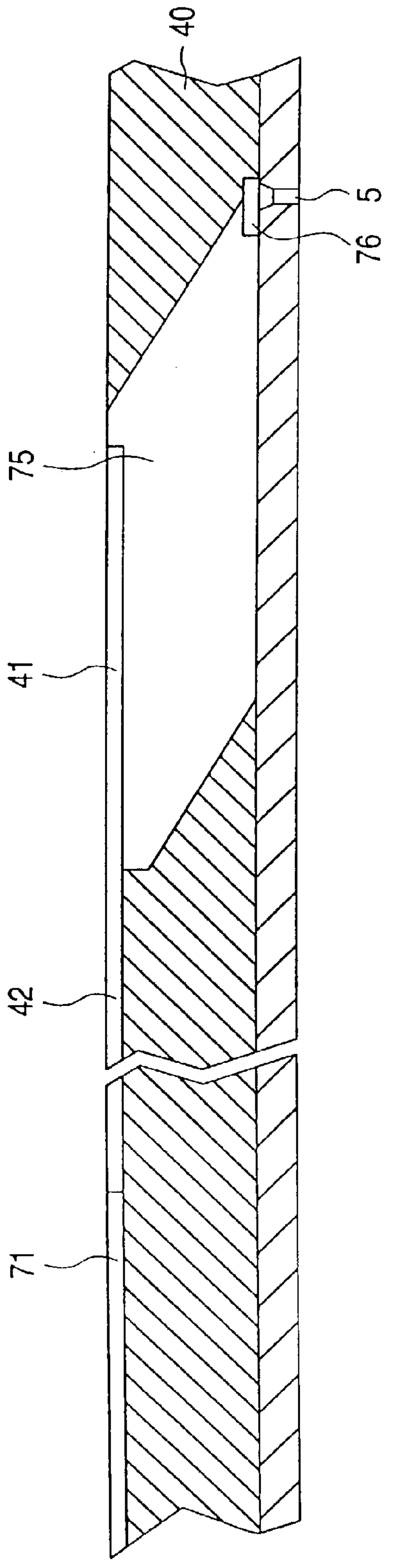
FIG. 15*a* and FIG. 15*b* are views showing another embodiment of the invention-in which a common ink chamber is formed as a recess, in a section structure taken along a longitudinal direction of a pressurizing chamber of a spacer, respectively.
Figure 15B:
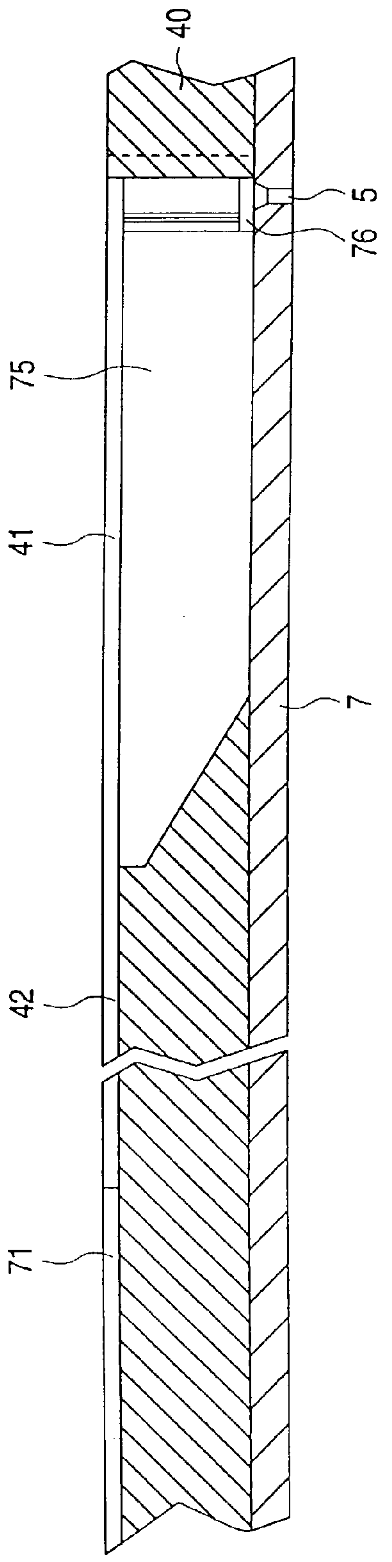

In the spacer 40 shown in FIGS. 15*a* and 15*b*, a through hole which will serve as the nozzle communicating hole 75 is first formed by anisotropic full etching of a silicon single-crystal substrate. Then, recesses which will serve as the pressurizing chamber 41, the ink supply port 42, and the common ink chamber 71 are formed by anisotropic half etching on one face of the silicon single-crystal substrate. The recess 76 through which the nozzle communicating hole 75 is to be communicated with the nozzle opening 5 is thereafter formed in one process by half etching on the surface and the back face or separately by processes for the surface and the back face. According to the embodiment, only the nozzle communicating holes 75 which discretely exist constitute through holes, and hence the rigidity which is in the vicinity of the inherent rigidity of the silicon single-crystal substrate constituting the spacer 40 can be effectively used. Thus, the nozzle plate 7 can be made thinner, and the nozzle opening 5 can be made smaller.

Figure 16:
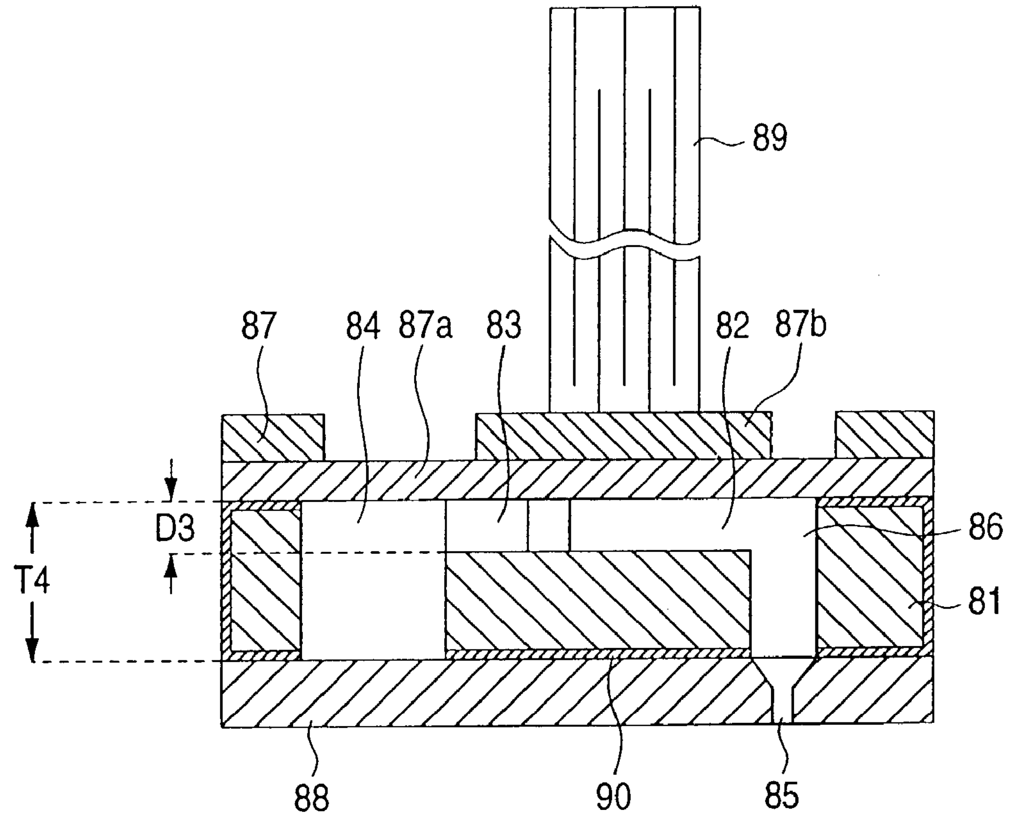
FIG. 16 is a view showing an embodiment of the ink jet recording head of the invention in a section structure in the vicinity of pressurizing chambers.
Figure 17:
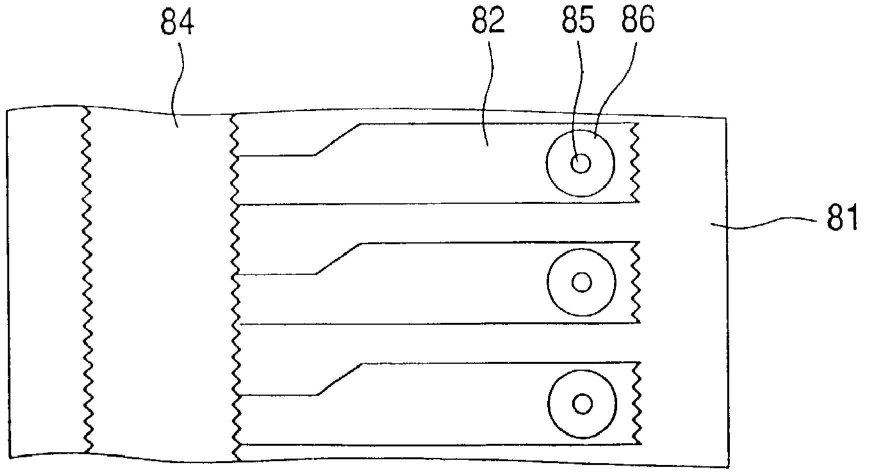
FIG. 17 is a top view showing a structure of a spacer with removing an elastic plate of the recording head.

FIGS. 16 and 17 show a section structure in the vicinity of a pressurizing chamber and a top structure of a spacer of another embodiment of an ink jet recording head of the invention, respectively. In the figures, the reference numeral 81 designates a spacer according to the present invention. In the spacer 81, a pressurizing chamber 82 and an ink supply port 83 having a depth D3 which is smaller than the thickness T4 of the silicon single-crystal substrate are formed on one face of a silicon single-crystal substrate having the surface of a predetermined crystal orientation, for example, a crystal orientation (110). A common ink chamber 84 formed as a through hole is formed at another end of the ink supply port 83 so as to be communicated with the ink supply port. A nozzle communicating hole 86 which is a through hole for connecting the pressurizing chamber 82 to a nozzle opening 85 is formed at another end of the pressurizing chamber 82.

The pressurizing chamber 82 and the ink supply port 83 are formed as shallow recesses by performing anisotropic etching on only one face of the silicon single-crystal substrate functioning as a base material of the spacer 81. The common ink chamber 84 is formed as a through hole by anisotropic etching on both faces of the silicon single-crystal substrate because the opening area is large.

On the other hand, the nozzle communicating hole 86 is required to have a diameter as small as possible. Therefore, the nozzle communicating hole is opened by irradiation of laser light from a laser apparatus using copper ions. A laser using copper ions has high absorptivity with a silicon single-crystal substrate and is a pulse laser. Consequently, a hole can be gradually bored in such a manner that very thin layers are peeled one by one. As compared with the case where continuous laser light from a carbon dioxide laser apparatus is used for boring a hole, the nozzle communicating hole 6 can be formed into a cylindrical shape which has a circular section. As compared with the case where a through hole is formed by anisotropic etching, ink can be smoothly supplied to the nozzle opening 5.

The thus configured spacer 81 is sandwiched by an elastic plate 87 on the pressurizing chamber side and a nozzle plate 88 on the other side, and they are integrally fixed to the spacer.

The elastic plate 87 comprises a vibration region which is configured as a thin portion 87*a*, and a thick portion 87*b* for efficiently transmit the vibration of a piezoelectric vibrating element 89 to the whole of the pressurizing chamber. An end of the piezoelectric vibrating element 89 of the longitudinal vibration mode is fixed to the thick portion 87*b*. In FIG. 16, the reference numeral 90 designates a protecting film of a silicon dioxide film on a silicon single-crystal substrate which constitutes a spacer 81.

In the embodiment, a through hole for connecting the nozzle opening 85 to the pressurizing chamber 82 can be formed without being affected by the rule of anisotropic etching of a silicon single-crystal substrate, and hence it is possible to determine the thickness in consideration of the rigidity which is to be provided in the spacer. Next, a method of producing the recording head will be described.

Figure 18:
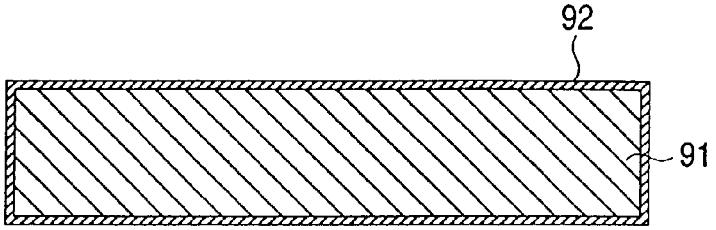
FIGS. 18(I) to 18(V) are views illustrating steps of the first half of a method of producing the recording head, respectively.
Figure 18:
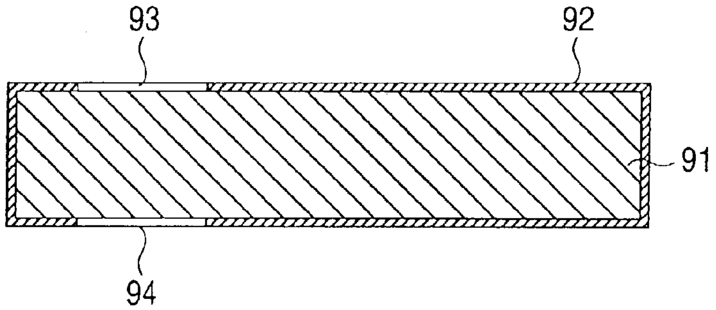
Figure 18:
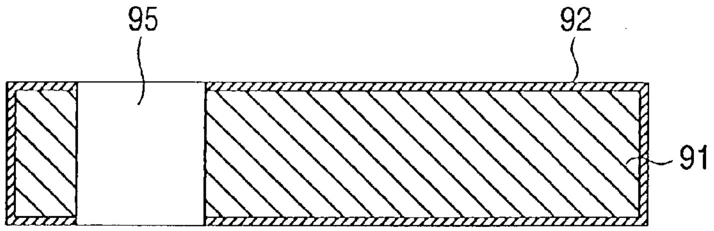
Figure 18:
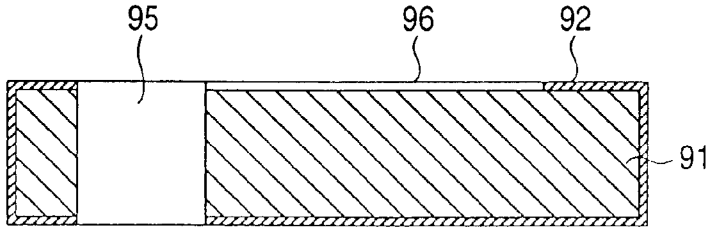
Figure 18:
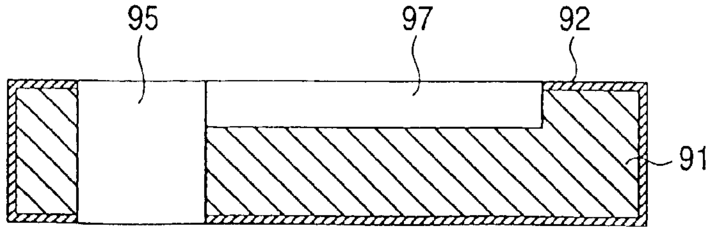

In FIGS. 18(I) to 18(V), the reference numeral 91 designates a silicon single-crystal substrate having the surface of a crystal orientation (110) and having a thickness at which the substrate can be easily handled in an assembling step, for example, a thickness of 220 μm. On at least one entire face of the substrate which is to be subjected to anisotropic etching, a silicon dioxide ($SiO_2$) film 92 is formed so as to have a thickness by which the film is allowed to function as a protecting film in an etching process described later, for example, a thickness of 1 μm, by thermal oxidation in which heating is performed at 1,000° C. for about four hours under an oxide atmosphere containing water vapor (FIG. 18(I)).

A pattern corresponding to an opening shape of the common ink chamber is formed at a position where a common ink chamber 84 is to be formed, and then subjected to exposure and development so as to provide a resist layer. An etching process using a silicon oxide etching fluid, for example, hydrofluoric acid buffer solution is performed so as to remove away a region of the silicon dioxide film 92 other than the resist layer, thereby forming windows 93 and 94 which will serve as the common ink chamber 84 (FIG. 18(II)).

Next, the substrate 91 is immersed in an aqueous solution of potassium hydroxide (KOH) of a concentration of 25 wt % which is kept at 80° C. so that anisotropic etching is started from both faces or the windows 93 and 94 in which the silicon dioxide film 92 is removed away. When a hole is bored by the etching through the substrate 91 in this way, the formation of a through hole 95 which will serve as the common ink chamber 84 is completed (FIG. 18(III)).

Next, a window 96 is formed by removing the silicon dioxide film 92 on one face in a region where the pressurizing chamber 82 and the ink supply port 83 are to be formed, in the same way as described above (FIG. 18(IV)). Thereafter, anisotropic etching is performed by using the silicon oxide etching solution which is the same as described above. In this step, since the etching progresses from only one face, the etching is stopped when the etching reaches a depth which is optimum as the pressurizing chamber 82, whereby a recess 97 is formed (FIG. 18(V)).

Figure 19:
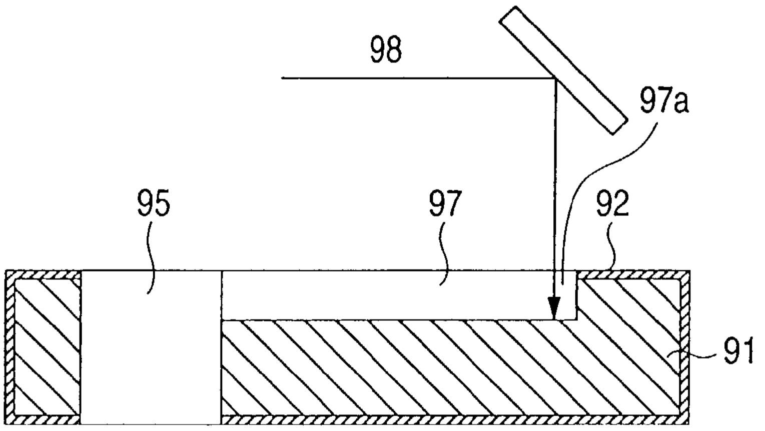
Figure 19:
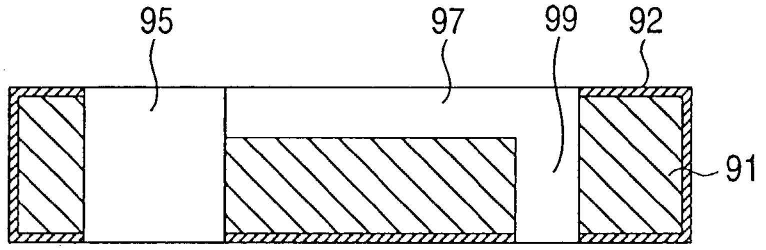
Figure 19:
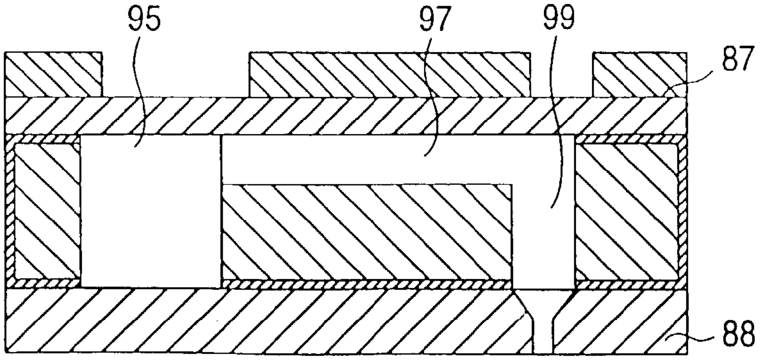

A position 97*a* where the nozzle communicating hole 86 is to be formed in the recess 97 which will serve as the pressurizing chamber 82 in which the nozzle communicating hole 86 is irradiated with a laser light 98 from a copper-ion laser apparatus (FIG. 19(I)). Since the laser light from the laser apparatus using copper ions is pulsatively excited, the silicon single-crystal substrate 91 and the silicon dioxide film 92 which are irradiated are intermittently evaporated and removed away, with the result that a through hole 99 having a small diameter required for the nozzle communicating hole 86 is bored (FIG. 10(II)).

In a stage in which the spacer is completed, the aforementioned elastic plate 87 is bonded to an opening face of the recess 97, and the nozzle plate 8 is bonded to the other face in such a manner that the nozzle opening 5 is communicated with the nozzle communicating hole 18, thereby completing a passage unit 13 which is the same as described above (FIG. 10(III)). In the thus configured passage unit 13, the spacer is made by the silicon single-crystal substrate 91 of a thickness of 220 μm or more which can exhibit a strength sufficient for easy handling. Accordingly, warpage and bending of the elastic plate 8 and the nozzle plate 88 which may easily occur in an adhesion step for producing a head with high printing density can be prevented from occurring as much as possible.

In order to enhance affinity to the ink in the passage and durability, the existing silicon dioxide film 92 may be removed away, and a silicon dioxide film may be formed again on the front face by a thermal oxidation method. In the embodiment, the nozzle communicating hole is formed by the radiation of laser light after the etching step. Alternatively, a nozzle communicating hole forming position of the silicon single-crystal substrate is first irradiated with laser light, so that a through hole 99 which will serve as the nozzle communicating-hole 86 is bored. Thereafter, in the steps shown in FIGS. 18(I) to 18(V), a through hole which will serve as the common ink chamber 4, and recesses which will serve as the pressurizing chamber 2 and the ink supply port 3 may be formed. In addition, in the above-described embodiment, the face on the side of the recess 97 which will serve as the pressurizing chamber is irradiated with the laser light so as to form the through hole 99. Alternatively, the face on which the nozzle plate is provided may be irradiated with laser light, whereby the through hole 99 is bored.

Next, a technique for constructing a recording head by abutting the piezoelectric vibrating element 11 against the above-mentioned passage unit 13 will be described.

Figure 20:
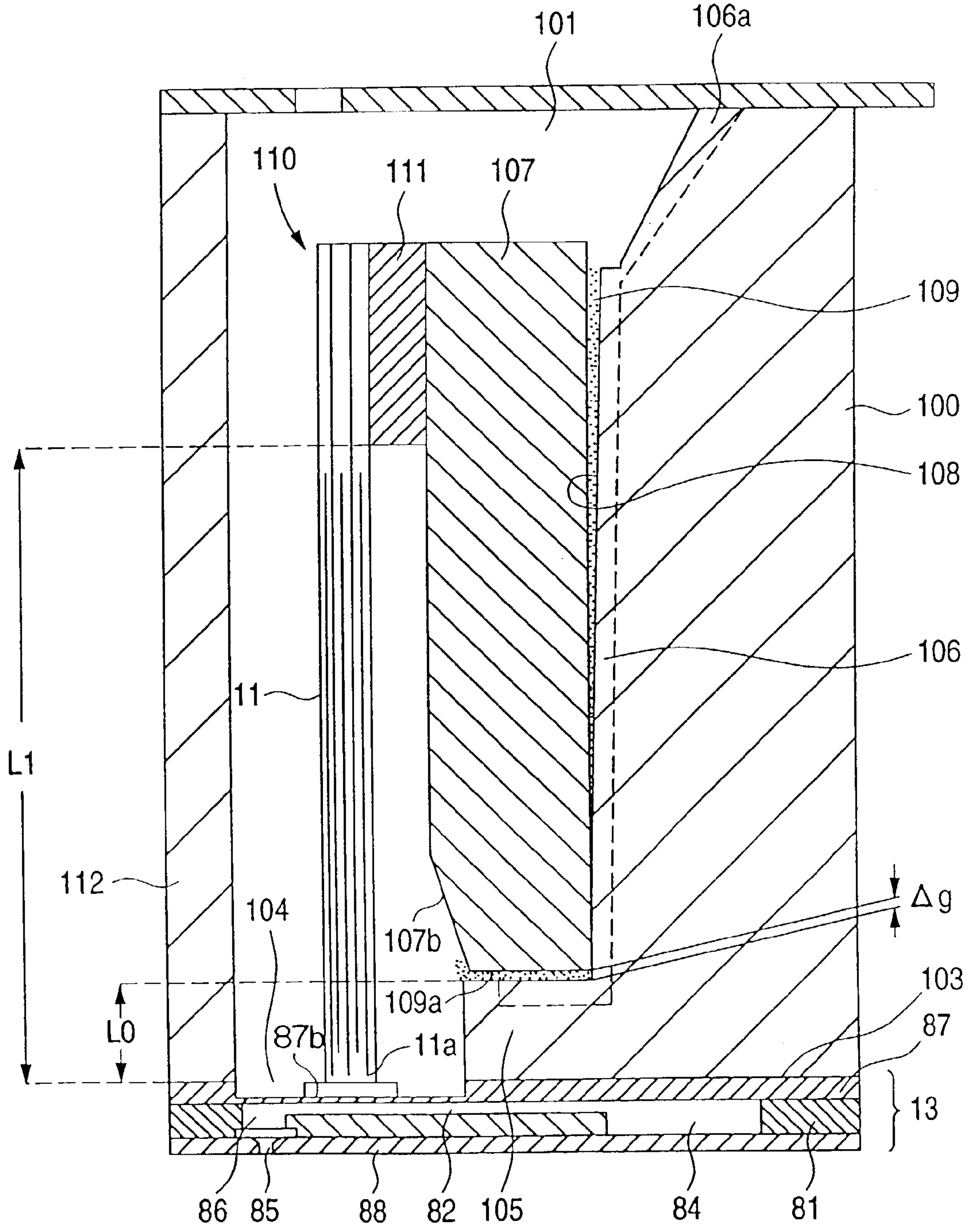
FIG. 20 is a section view showing an embodiment of the ink jet recording head of the invention.
Figure 21A:
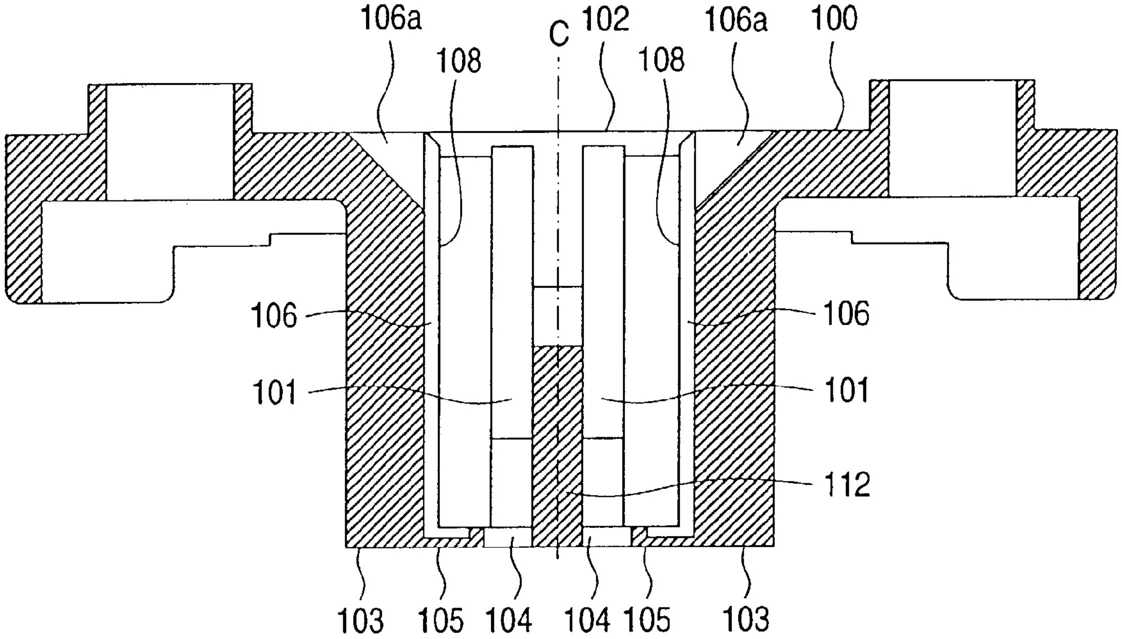
FIGS. 21*a* and 21*b* are section views showing an embodiment of a frame, in a structure of a section perpendicular to a side wall and that of a section parallel to the side wall, respectively.
Figure 21B:
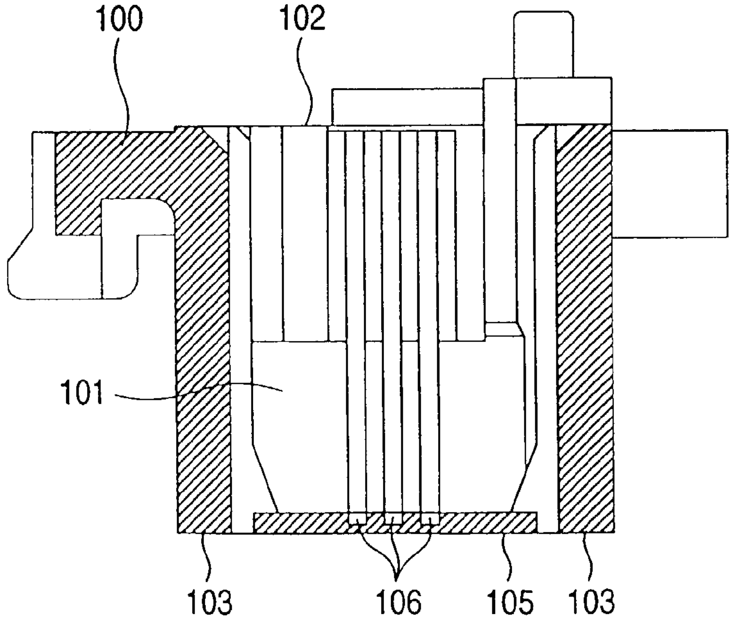

FIG. 20 is a view showing a section structure of a recording head which is configured by using a frame 100 suitable for fixing the passage unit 13 and the piezoelectric vibrating element 11. FIGS. 21*a* and 21*b* show an embodiment of the frame 100.

The frame 100 is formed as a cylinder having an accommodating chamber 101 for the piezoelectric vibrating element by injection molding of a polymer material or the like. An opening 102 into which the piezoelectric vibrating elements 11 are to be inserted is formed on one end of the frame 100, and a fixing portion 103 to which the passage unit 13 is to be fixed via an adhesive layer is formed on the other end. On the same face as the fixing portion 103, a window 104 for exposing an end 11*a* of the piezoelectric vibrating element 11 is formed. In addition, an overhang portion 105 which overhangs on the side of the window 104 and protrudes in the vicinity of the thick portion 87*b* of the elastic plate 87 is formed.

The reference numeral 106 designates grooves for injecting an adhesive. A tapered portion 106*a* for guiding the insertion of an injection needle is formed at an upper end of each groove 106. The grooves 106 are formed so as to be symmetrical in the arrangement direction. Each of the grooves 106 downwardly elongates from the tapered portion 106*a* to the middle of the overhang portion 105 along a wall face 108 of the accommodating chamber 101 which opposes a fixing substrate 107 of a piezoelectric vibrating element unit 110. The grooves 106 have a depth of, for example, about 0.2 mm by which the adhesive can flow into a region where the overhang portion 105 opposes an end 107*a* of the fixing substrate 107 by a capillary force. The wall face 108 of the frame 100 is formed as a slope so as to form a wedge-like gap 109. As a result, the distance between wall face at the opening 102 and the fixing substrate 107 becomes larger.

Figure 23:
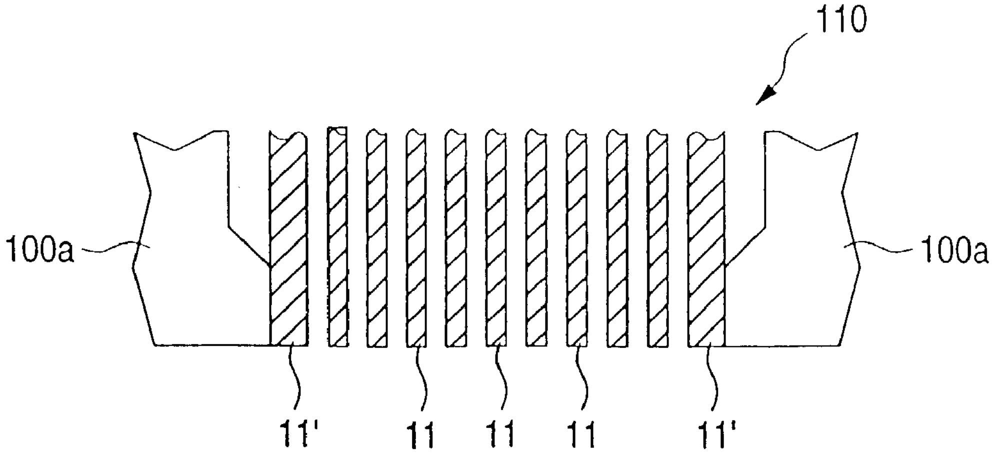
FIG. 23 is a view showing an embodiment of a positioning structure using a frame of a piezoelectric vibrating element unit.

As shown in FIG. 23, dummy vibrating elements 11' and 11' are disposed in the vibrating element unit 110. The dummy vibrating elements 11' and 11' are made of the same material as that of the piezoelectric vibrating elements 11 but are formed so as to be slightly thicker than the piezoelectric vibrating elements 11. The driving signal is not supplied to the dummy vibrating elements 11' and 11'. These vibrating elements are fixed to a rear end plate 111 at regular pitches, and the rear end plate 111 is then fixed to the fixing substrate 107. In the fixing substrate 107, a slope 107*b* is formed in the thickness direction so that an end of the fixing substrate 107 does not protrude from the overhang portion 105 to the piezoelectric vibrating element 11 side.

Accordingly, the dummy vibrating elements 11' and 11' on both side ends are in contact with a side portion 100*a* of the opening 101 of the frame 100 when the vibration unit 110 is inserted into the frame 100, so as to function as guiding members. As a result, the piezoelectric vibrating elements 11 can precisely abut against the thick portion 87*h* of the elastic plate 87.

The fixing substrate 107 is desirably made of a material having a coefficient of thermal expansion which is substantially equal to that of the piezoelectric vibrating element 11, for example, a piezoelectric material or another ceramic material. In the case where the rigidity must be ensured in order to prevent crosstalk caused by stress of expansion and contraction of the piezoelectric vibrating element 8 from occurring, the fixing substrate 107 may be made of a metal material. In FIG. 21*a*, the reference numeral 112 designates a wall for dividing the accommodating chamber 101 of the frame into two chambers.

Figure 22:
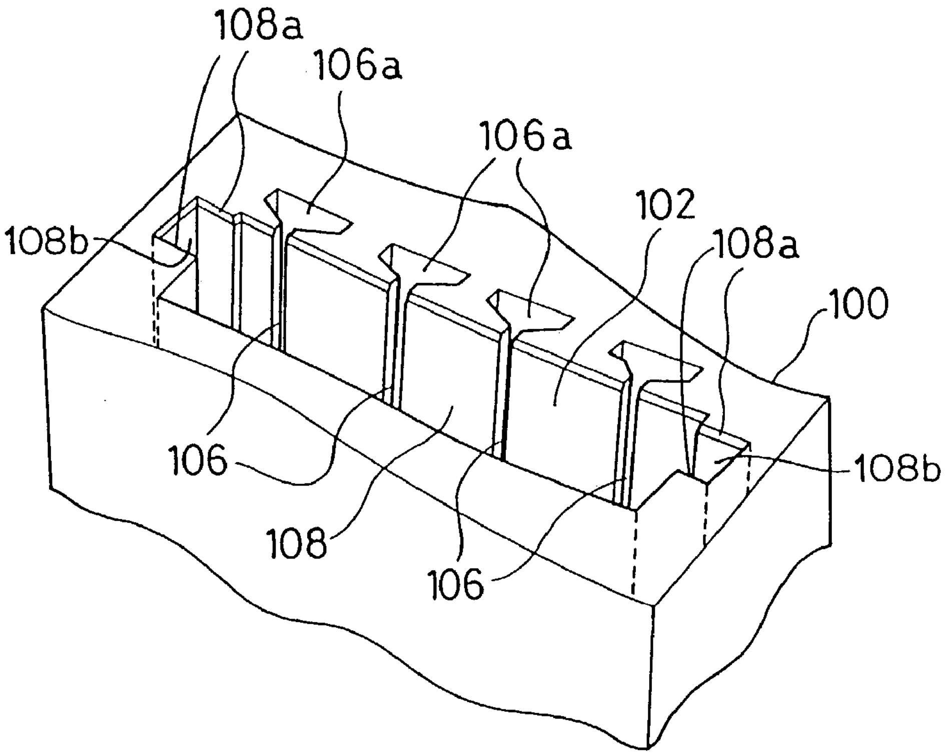
FIG. 22 is a view showing a structure in the vicinity of an opening of a frame.

When a recording head is to be produced by using the thus constructed frame 100, the frame 100 is set so that the fixing portion 103 is placed upward, and the passage unit 13 is fixed to the fixing portion 103 via an adhesive layer. Then, the frame 100 is set again so that the opening 101 is placed upward, and an adhesive is applied to the end 11*a* of the vibrating element 11. When the vibrating element unit 110 is inserted from the opening 101, both sides of the fixing substrate 107 are guided by the guides 108*a* on both sides of the wall face 108 (FIG. 22), and the dummy vibrating elements 11' and 11' are downwardly guided by a side portion 100*a* of the frame. When the end 11*a* of the piezoelectric vibrating element 11 abuts against the thick portion 87*b* of the elastic plate 87, the position of the piezoelectric vibrating element 11 along the axial direction is determined.

At the stage where the positioning is completed, a gap exists between the fixing substrate 107 and the side wall 108, and a slight gap Δg is caused between the end 107*a* of the fixing substrate 107 and the surface of the overhang portion 105. Under this condition, when a predetermined quantity of liquid adhesive is injected by using an injection needle or the like from the tapered portion 106*a* of the groove 106 formed on the side wall 108, the adhesive enters the space formed by the fixing substrate 107 and the groove 106, and then penetrates into the narrow gap Δg of the overhang portion 105 by a capillary force. The adhesive penetrating in the gap Δg is stopped by surface tension at an end of the gap Δg between the overhang portion 105 and the fixing substrate 107 by forming a meniscus. Thus, the adhesive will not flow to the elastic plate 87. The adhesive in the groove 106 penetrates also into a gap between the fixing substrate 107 and the side wall 108 of the frame 100 by a capillary force, so that the adhesive enters between the entire face of the fixing substrate 107 and the side wall.

Figure 28:
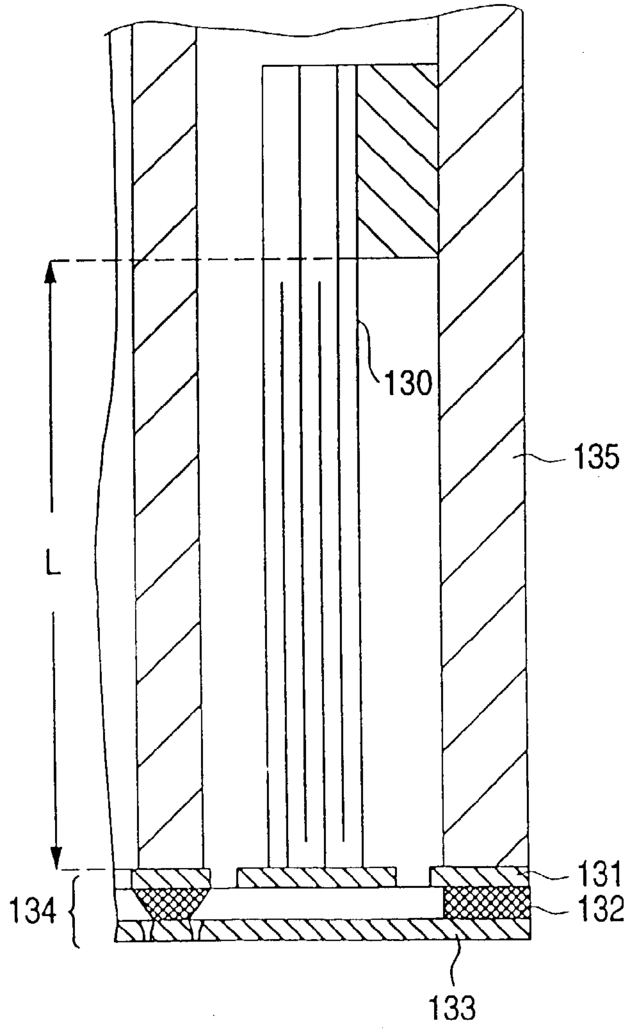
FIG. 28 PRIOR ART
FIG. 28 is a diagram showing joint relationships among a piezoelectric vibrating element, a passage unit, and a frame in a prior art ink jet recording head.

Under this condition, heating is performed up to a temperature at which the curing of the adhesive is promoted, for example, 60° C. During the curing process, the frame 100 and the fixing substrate 107 are expanded based on the coefficients of thermal expansion of their respective materials. The coefficients of thermal expansion of the piezoelectric vibrating element 11 and the fixing substrate 107 are selected so as to be substantially equal to each other and the thickness $L_0$ of the overhang portion 105 is about 1 mm. Even if the effective length L of the piezoelectric vibrating element 11 is as large as about 5.5 mm, therefore, the difference in thermal expansion per temperature difference of 40° C. can be suppressed to be as small as 1 to 2 μm. In the conventional ink jet recording head (FIG. 28), the end portion of the piezoelectric vibrating element is fixed to the frame, and hence a difference in thermal expansion which corresponds to the effective length L=5.5 mm of the piezoelectric vibrating element is caused. The magnitude of the difference is about 5 to 10 μm which is five (5) times as large as that in the invention.

In the embodiment, the configuration for eliminating disadvantages caused by the difference in the coefficients of thermal expansion due to the difference in materials between the piezoelectric vibrating element 11 and the frame 100 has been described. A large difference exists in the coefficients of thermal expansion between the silicon single-crystal substrate constituting the spacer 81 which is the main component of the passage unit 13 and a polymer material constituting the frame 100. If the passage unit 13 is firmly fixed to the frame 100 with an adhesive, therefore, there occurs a problem in that a stress is caused by the difference in the coefficients of thermal expansion in the plane direction of the passage unit 13, so that warpage of the passage unit 13 degrades the printing quality.

Figure 24:
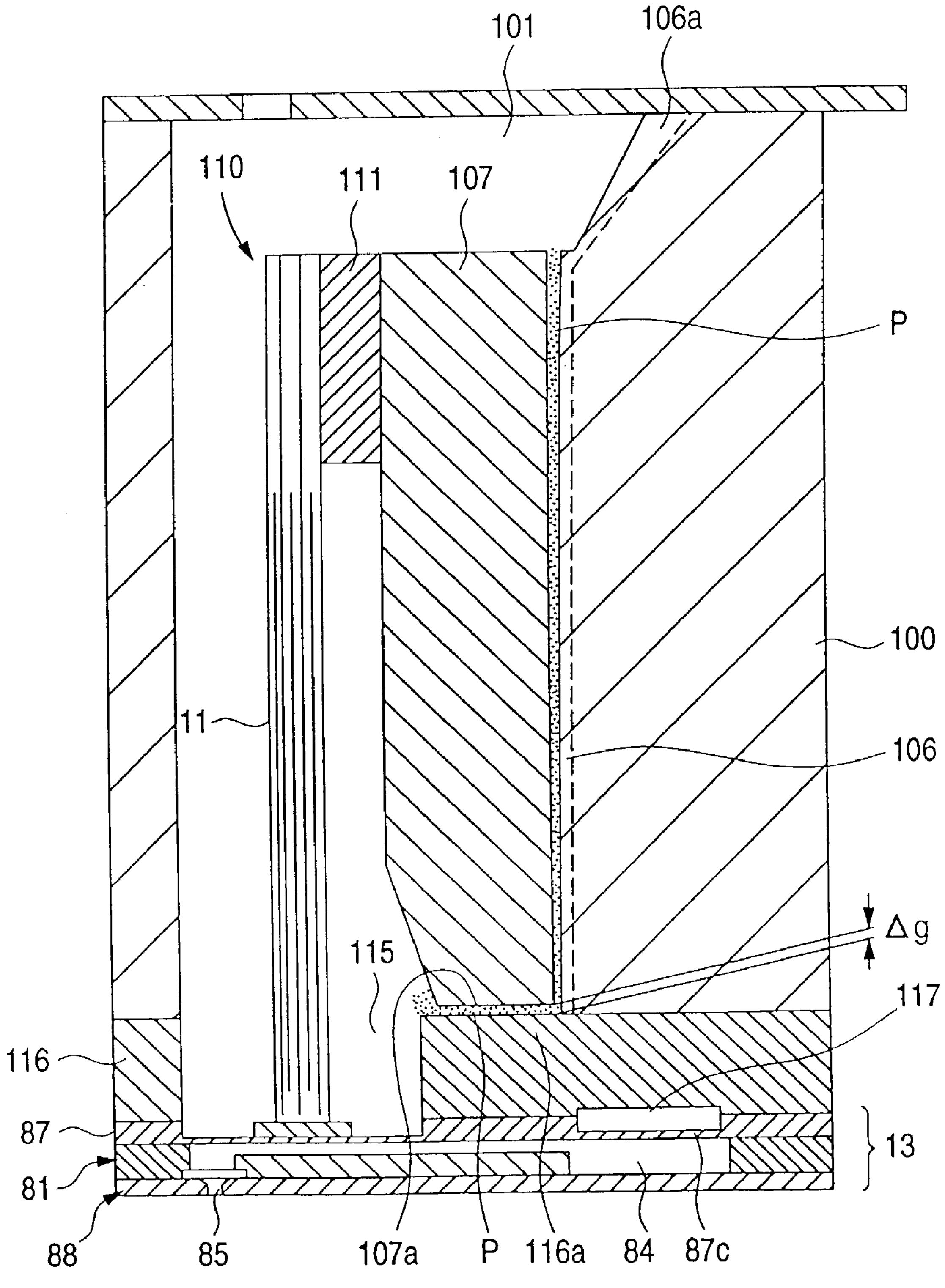
FIG. 24 is a section view showing another embodiment of the invention.
Figure 25:
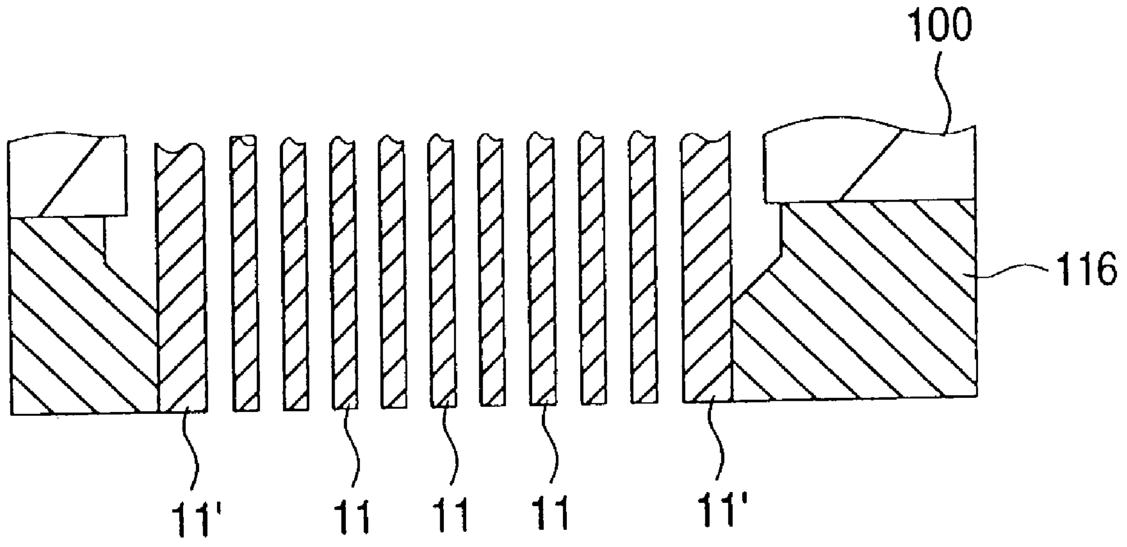
FIG. 25 is a section view showing a positioning structure of a piezoelectric vibrating element unit in the embodiment.

FIG. 24 shows a further embodiment of the invention which solves such a problem. In the embodiment, a buffer or buffering member 116 having a window 115 is interposed between a fixing portion 103 of a frame 100 and a passage unit 13, and the fixing portion 103 of the frame 100 is fixed to the passage unit 13 via the buffering member 116 with an adhesive. The buffering member 116 comprises an overhang portion **116*a* formed in such a manner that it does not interfere with displacement of an elastic plate 87 in at least a region opposing a pressurizing chamber. The overhang portion 116*a* slightly protrudes from the frame 100 to the side of the piezoelectric vibrating element 11 so as to form an adhesive face for an end 107*a* of a fixing substrate 107 of a piezoelectric vibrating element unit 110. The end 107*a* of the fixing substrate 107 is fixed by an adhesive P. In the arrangement direction of the piezoelectric vibrating elements 11, as shown in FIG. 25, dummy vibrating elements 11' and 11' are guided, and the dummy vibrating elements 11' and 11'** function also as positioning members.

As a material for the buffering member 116, used is a material having high rigidity for reinforcing the strength of the passage unit 13 in the plane direction, having a linear expansion coefficient in the middle of the linear expansion coefficient of the frame 100 and that of the silicon single-crystal substrate constituting the spacer 81, and desirably having an ink resistant property. For example, stainless steel, specifically SUS430 having a linear expansion coefficient of 9E-6/° C. is used, and is formed into the buffering member by metal press working. As another example, a thermosetting resin may be used. The thermosetting resin can be easily worked into desired shape by injection molding. In addition, it is possible to relatively easily select a material having high rigidity and having a linear expansion coefficient in the middle of the linear expansion coefficients of the silicon single-crystal substrate constituting the spacer 81 and the frame 100.

As described above, the buffering member 116 is interposed between the passage unit 13 and the frame 100, so that the strength of the passage unit 13 is reinforced by the rigidity of the buffering member 116. Furthermore, a difference in thermal expansion between the passage unit 13 and the frame 100 is reduced, so that bend and warpage of the passage unit 13 caused by a temperature variation can be prevented from occurring as much as possible, and variations in ink drop ejection performance can be suppressed.

In addition to the above-described construction, in the region opposing the common ink chamber 84, a recess 117 may be formed on the common ink chamber side, and the region of the elastic plate 87 may be formed as a thin portion **87*c*, so that the compliance of the common ink chamber 87** is ensured. Thus, crosstalk can be more surely reduce. For reference purposes, materials, linear expansion coefficients, Young's modulus, plate thicknesses of elements constituting the recording head of the embodiment are listed in Table 1.

TABLE 1

| | Materials | Liner expansion coefficients (E-6/° C.) | Young's modulus (kg/mm$^2$) | Plate thickness (mm) |
|---|---|---|---|---|
| Nozzle plate | SUS316 | 17 | 19700 | 0.08 |
| Spacer | Si | 2 | 15900 | 0.28 |
| Vibrator | PPS + SUS304 | about 17 | about 700 | 0.03 |
| Frame | Liquid crystal polymer | 38 | 880 | 2 |
| Buffer member | SUS430 | 9 | 20400 | 0.7 |

Figure 26:
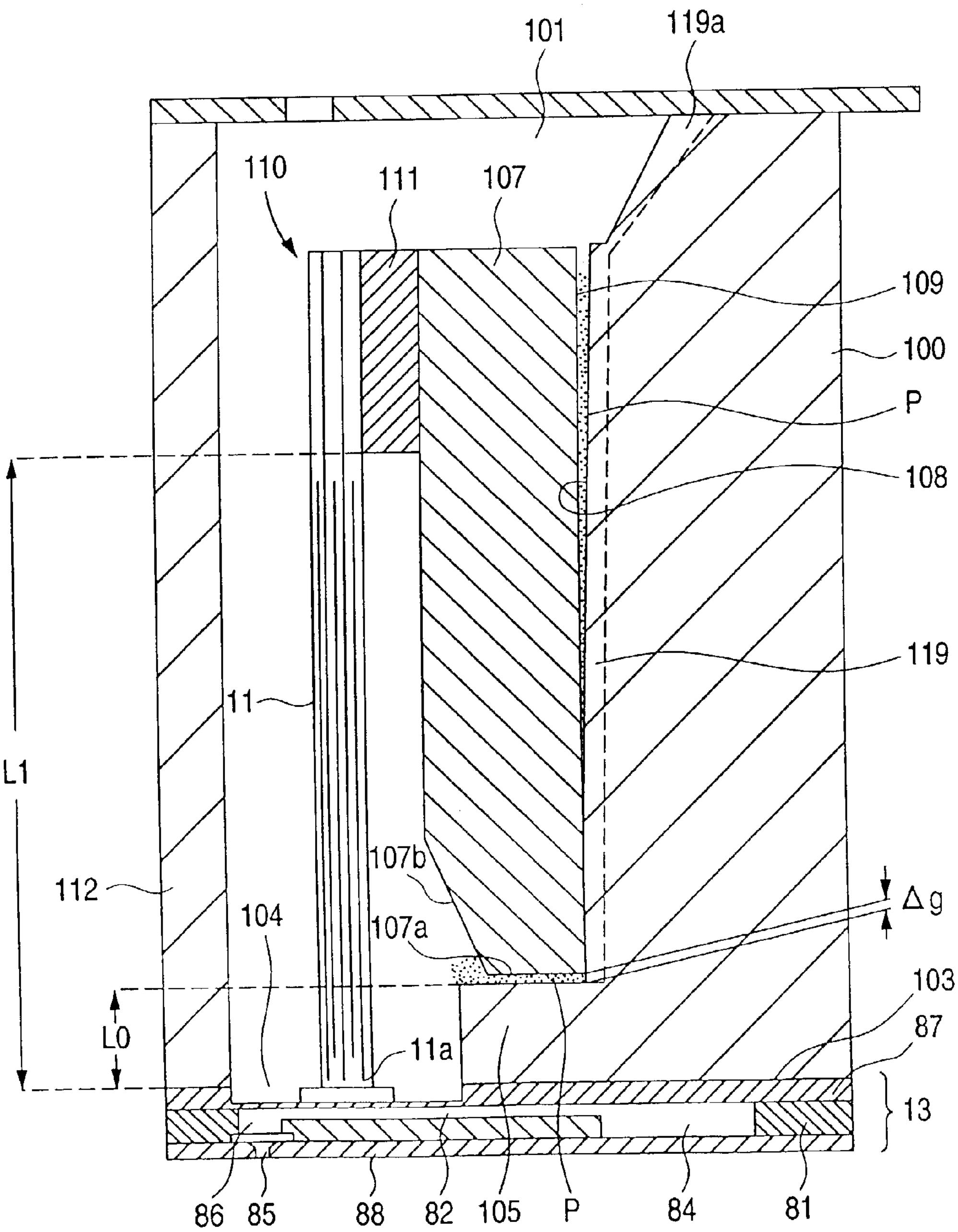
FIG. 26 is a section view showing another embodiment of the invention.
Figure 27:
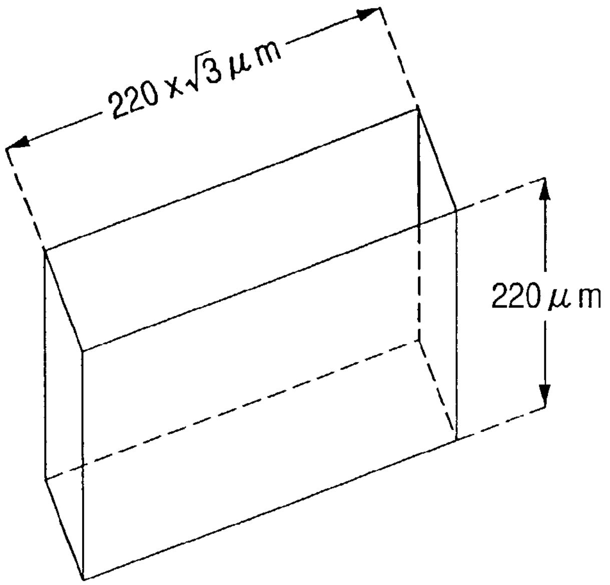
FIG. 27 is a diagram showing a through hole formed by anisotropic etching of a silicon single-crystal substrate.

In the embodiment shown in FIG. 20, the groove 106 for injecting an adhesive extends to the overhang portion 105. Alternatively, as shown in FIG. 26, a groove 119 which is stopped at the overhang portion 105 may be formed. In the alternative, the adhesive first enters the groove 119 and then penetrates into a narrow wedge-like space 109 in which the upper portion is tapered and which is formed between the fixing substrate 107 and the side wall 108, and a gap between the end **107*a* of the fixing substrate 107 and the overhang portion 105 by a capillary force, so as to spread therebetween. Accordingly, as compared with the embodiment shown in FIG. 20 in which the groove is formed up to the overhang portion 105, the disadvantage in that the adhesive is concentrated in the vicinity of the groove 106 (FIG. 20) can be eliminated as far as the flatness of the fixing substrate 107 and the overhang portion 105 is ensured. Thus, the adhesive can be surely diffused to the entire overhang portion 105. In FIG. 26, the reference numeral 119*a* designates an adhesive injection port formed at the upper end of the groove 119**.

What is claimed is:

1. A method of producing an ink jet recording head, comprising:

fixing a passage unit in which a nozzle pate having a nozzle opening, a spacer forming a pressurizing chamber and a common ink chamber, and an elastic plate having a thick portion adapted to abut against an end of a piezoelectric vibrating element are stacked, to an opening of a frame having an overhang portion which overhangs to a vicinity of the thick portion;

inserting a vibrating element unit into the frame, the vibrating element unit being configured by fixing a plurality of piezoelectric vibrating elements operating in a longitudinal vibration mode to a fixing substrate; and injecting an adhesive into a groove formed in a region of the frame opposing the fixing substrate.

2. The method as set forth in claim 1, wherein the groove extends to a region of the overhang portion opposing an end of the fixing substrate.

* * * * *